United States Patent
Schmidt

(10) Patent No.: US 10,220,569 B2
(45) Date of Patent: Mar. 5, 2019

(54) GENERATING SUPPORT MATERIAL FOR THREE-DIMENSIONAL PRINTING

(71) Applicant: AUTODESK, INC., San Rafael, CA (US)

(72) Inventor: Ryan Michael Schmidt, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 949 days.

(21) Appl. No.: 14/299,991

(22) Filed: Jun. 9, 2014

(65) Prior Publication Data

US 2015/0151492 A1    Jun. 4, 2015

Related U.S. Application Data

(60) Provisional application No. 61/911,311, filed on Dec. 3, 2013.

(51) Int. Cl.
| | |
|---|---|
| *B29C 64/40* | (2017.01) |
| *B33Y 50/02* | (2015.01) |
| *G06F 17/50* | (2006.01) |
| *B29C 64/386* | (2017.01) |
| *G05B 19/4099* | (2006.01) |
| *B29C 67/00* | (2017.01) |
| *G06F 3/12* | (2006.01) |
| *B29C 64/20* | (2017.01) |

(52) U.S. Cl.
CPC ............ *B29C 64/386* (2017.08); *B29C 64/40* (2017.08); *G05B 19/4099* (2013.01); *B33Y 50/02* (2014.12); *G05B 2219/49038* (2013.01); *G06F 17/50* (2013.01); *G06F 2217/12* (2013.01); *Y02P 90/265* (2015.11)

(58) Field of Classification Search
None
See application file for complete search history.

(56) References Cited

U.S. PATENT DOCUMENTS

| | | | |
|---|---|---|---|
| 2009/0072447 A1* | 3/2009 | Hull | B29C 67/0092 264/401 |
| 2012/0010741 A1* | 1/2012 | Hull | B29C 67/0092 700/98 |

(Continued)

*Primary Examiner* — Ronald D Hartman, Jr.
(74) *Attorney, Agent, or Firm* — Artegis Law Group, LLP

(57) ABSTRACT

In one embodiment of the present invention, a support structure generator creates support structures designed to buttress three-dimensional (3D) digital models during 3D printing. In operation, the support structure generator incrementally constructs a support graph that connects overhanging points included in the 3D model with support points on a horizontal ground plane or relatively flat surfaces in the 3D model. After generating the 3D model, the support structure generator translates the connections between the nodes into support posts sized to sufficiently support the connected surfaces with the minimum amount of support material. Advantageously, the support structure is noticeably sparser than conventional support structures that fill a given support region with a solid volume of support material. Consequently, the time necessary for 3D printers to fabricate the support structure of interconnected support posts is less than the time required for 3D printers to fabricate conventional support structures.

20 Claims, 13 Drawing Sheets

(56) References Cited

U.S. PATENT DOCUMENTS

| | | | |
|---|---|---|---|
| 2015/0066178 A1* | 3/2015 | Stava | B29C 67/0088 700/98 |
| 2015/0151493 A1* | 6/2015 | Schmidt | B29C 67/0092 700/98 |
| 2016/0136883 A1* | 5/2016 | Schmidt | B29C 67/0088 264/129 |
| 2016/0144574 A1* | 5/2016 | Eilken | G06T 19/20 264/129 |
| 2016/0200051 A1* | 7/2016 | Urbanic | B29C 64/40 264/308 |
| 2017/0069127 A1* | 3/2017 | Umetani | B33Y 50/00 |
| 2017/0336777 A1* | 11/2017 | Koh | G05B 19/4099 |

* cited by examiner

3D Model with Highlighed Overhangs 510

3D Model with Support Geometry 540

GENERATING SUPPORT MATERIAL FOR THREE-DIMENSIONAL PRINTING

CROSS-REFERENCE TO RELATED APPLICATIONS

This application claims benefit of the U.S. Provisional Patent Application having Ser. No. 61/911,311, filed on Dec. 3, 2013, which is hereby incorporated herein by reference.

BACKGROUND OF THE INVENTION

Field of the Invention

Embodiments of the present invention relate generally to computer processing and, more specifically, to generating support material for three-dimensional printing.

Description of the Related Art

A typical three-dimensional (3D) printer generates a 3D solid object based on a 3D printable digital model, such as a 3D mesh of triangles. In operation, the 3D printer creates the 3D object from bottom to top. For instance, if the digital model were to represent a candy cane, then the 3D printer would print successive layers of material beginning with a layer corresponding to the bottom of the stem and ending with a layer corresponding to the top of the hook. To avoid subsequent un-supported layers (such as the hook of a candy-cane) collapsing and/or drooping onto proceeding layers or the ground due to gravity during the printing process, 3D printers typically generate bloated 3D objects.

Such bloated 3D objects include not only material that represents the 3D object but also "support structures" that ensure the integrity of the material that forms the 3D object throughout the 3D printing process. Often, the 3D printer generates support structures in a different type of material (support material) than the material used to generate the geometries associated with the 3D object. After the 3D printer generates the bloated 3D object, then a designer performs post-processing operations to remove the now-extraneous support material and reveal the desired 3D object. For instance, the designer may break off or dissolve the support material.

In one approach to generating support material, the 3D printer first identifies overhanging surfaces of the 3D model that require support. The 3D printer then projects these overhanging surfaces to the ground, creating projected regions. Finally, the 3D printer fills the volume between each overhanging surface and the corresponding projected region with support material. Again, after the 3D printer has generated the 3D model, the support material is superfluous.

One limitation to filling volumes with support material is that generating the support material is time consuming. Consequently, fabricating volumes of support material between overhanging surfaces and the ground may increase the execution time of the 3D printer to unacceptable levels. Further, the support material is often costly. In general, as the amount of support material that the 3D printer generates increases, the cost-effectiveness of 3D printing decreases.

As the foregoing illustrates, what is needed in the art are more effective techniques for generating support material for 3D printing.

SUMMARY OF THE INVENTION

One embodiment of the present invention sets forth a computer-implemented method for generating a plurality of support posts implemented when printing three-dimensional models. The method includes identifying a first overhanging surface in a three-dimensional model based on a maximum overhang threshold, where the first overhanging surface includes a first contact point and a second contact point; generating a first set of support posts that connects the first contact point to a first support point; and generating a second set of support posts that connects the second contract point to a second support point, where no post included in the second set of support posts intersects the first contact point.

One advantage of disclosed approach is that the support posts enable efficient implementation of 3D models without risking defects attributable to gravity. Notably, the support posts effectively buttress the 3D model using less support material than conventional support structures that fill support regions with a solid volume of support material. Advantageously, reducing the amount of generated support material reduces both the quantity of support material and the time required for a 3D printer to print robust 3D objects.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1A:
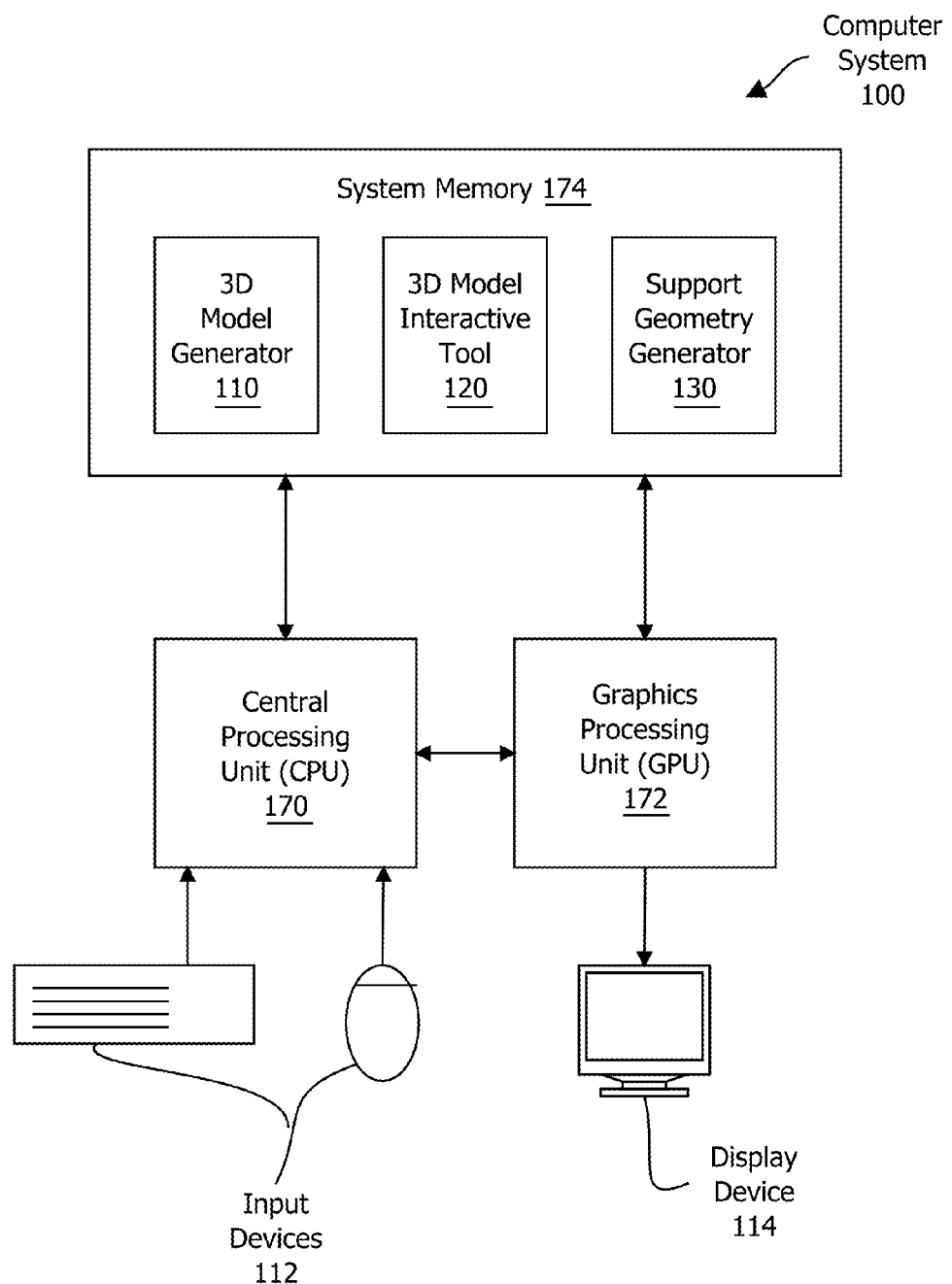
FIG. 1A is a block diagram illustrating a computer system configured to implement one or more aspects of the present invention.

FIG. 1A is a block diagram illustrating a computer system 100 configured to implement one or more aspects of the present invention. As shown, the computer system 100 includes, without limitation, a central processing unit (CPU) 170, a system memory 150, a graphics processing unit (GPU) 172, input devices 112, and a display device 114.

The CPU 170 receives input user input information from the input devices 112, such as a keyboard or a mouse. In operation, the CPU 170 is the master processor of the computer system 100, controlling and coordinating operations of other system components. In particular, the CPU 170 issues commands that control the operation of the GPU 172. The GPU 172 incorporates circuitry optimized for graphics and video processing, including, for example, video output circuitry. The GPU 172 delivers pixels to the display device 114 that may be any conventional cathode ray tube, liquid crystal display, light-emitting diode display, or the like. In various embodiments, GPU 172 may be integrated with one or more of other elements of FIG. 1A to form a single system. For example, the GPU 172 may be integrated with the CPU 170 and other connection circuitry on a single chip to form a system on chip (SoC).

The system memory 174 stores content, such as software applications and data, for use by the CPU 170 and the GPU 172. As shown, the system memory 174 includes a 3D model generator 110, a 3D model interactive tool 120, and a support geometry generator 130. The 3D model generator 310, the 3D model interactive tool 120 and the support geometry 130 are software applications that execute on the CPU 170, the GPU 172, or any combination of the CPU 170 and the GPU 172. Both the 3D model interactive tool 120 and the support geometry generator 130 facilitate 3D printing.

The 3D model generator 110 enables specification of a 3D model 117. The 3D model interactive tool 120 dynamically identifies "overhanging" geometries in the 3D model 117 that exceed an overhang angle threshold supported by a 3D printer 150. The support geometry generator 130 creates support geometry 140 that reinforces the overhanging geometries in the 3D model 117. In alternate embodiments, the system memory 174 may not include the 3D model generator 110, the 3D model interactive 120 tool and/or the support geometry generator 130. In other embodiments, the 3D model generator 110, the 3D model interactive tool 120 and/or the support geometry generator 130 are integrated into any number (including one) of software applications. In some embodiments, the 3D model generator 110, the 3D model interactive tool 120 and/or the support geometry generator 130 may be provided as an application program (or programs) stored on computer readable media such as a CD-ROM, DVD-ROM, flash memory module, or other tangible storage media.

The components illustrated in the computer system 100 may be included in any type of computer system 100, e.g., desktop computers, server computers, laptop computers, tablet computers, and the like. Additionally, software applications illustrated in computer system 100 may execute on distributed systems communicating over computer networks including local area networks or large, wide area networks, such as the Internet. Notably, the 3D model interactive 120 tool and the support geometry generator 130 described herein are not limited to any particular computing system and may be adapted to take advantage of new computing systems as they become available.

It will be appreciated that the computer system 100 shown herein is illustrative and that variations and modifications are possible. The number of CPUs 170, the number of GPUs 172, the number of system memories 174, and the number of applications included in the system memory 174 may be modified as desired. Further, the connection topology between the various units in FIG. 1A may be modified as desired.

Figure 1B:
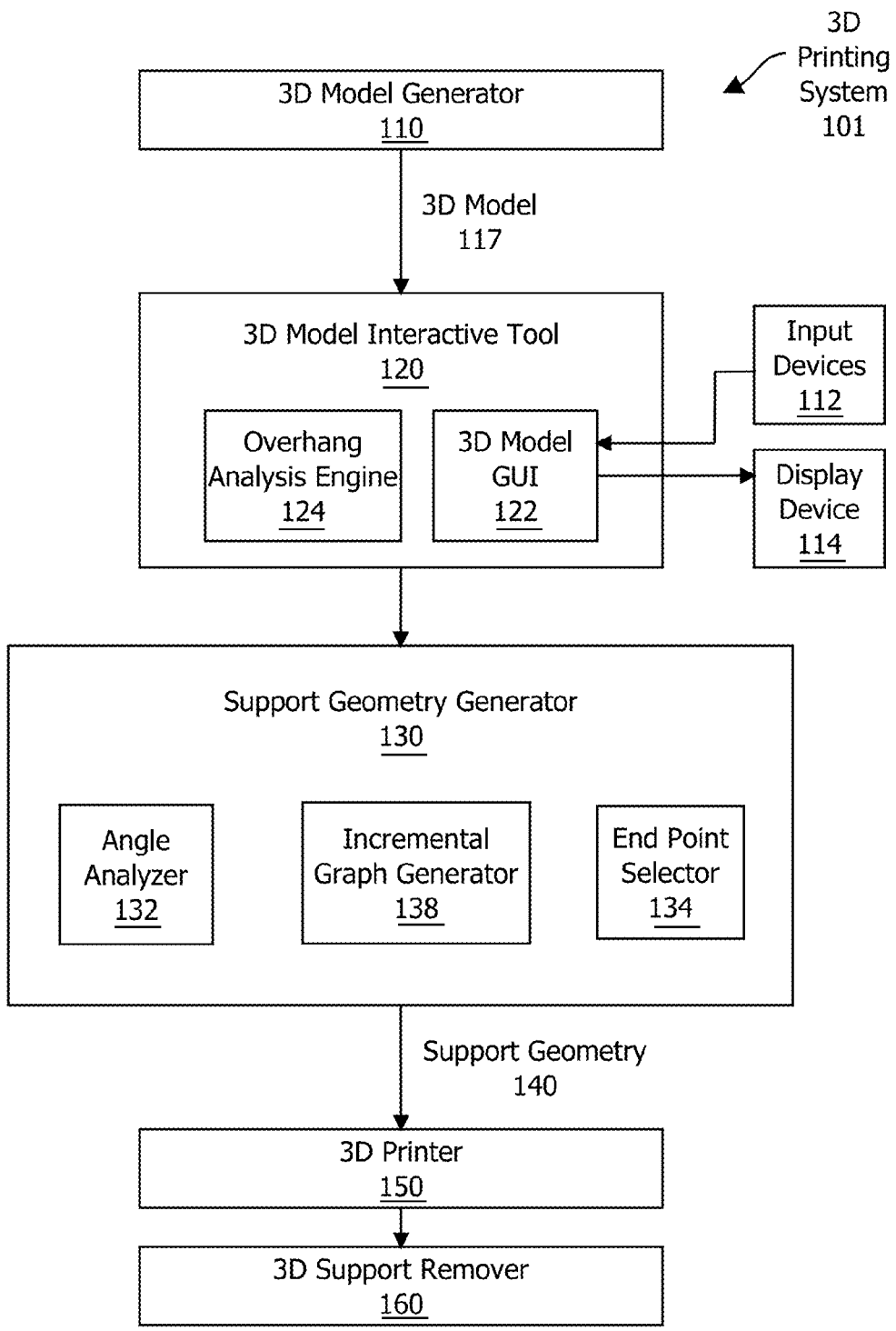
FIG. 1B is a block diagram illustrating a three-dimensional (3D) printing system controlled by the computer system of FIG. 1A and configured to implement one or more aspects of the present invention.

FIG. 1B is a block diagram illustrating a three-dimensional (3D) printing system 101 controlled by the computer system 100 of FIG. 1A and configured to implement one or more aspects of the present invention. As shown, the 3D printing system 101 includes, without limitation, the 3D model generator 110, the 3D model interactive tool 120, the support geometry generator 130, the 3D printer 150, and a 3D support remover 160. As shown in FIG. 1A, the 3D model generator 110, the 3D model interactive tool 120, and the support geometry generator 130 are included in the system memory 174 of the computer system 100 and execute on the CPU 170 and/or the GPU 172.

In operation, the 3D model generator 110 enables specification of the 3D model 117. The 3D model 117 describes a desired 3D solid object. The 3D model generator 110 may be implemented in any technically feasible fashion. For instance, the 3D model generator 110 may include computer aided design (CAD) software. Such CAD software often includes a graphical user interface that converts designer input such as symbols and brush stroke operations to geometries in the 3D model 117. Alternatively the 3D model generator 110 may be a 3D scanner that analyzes an existing 3D solid object to create the 3D model 117 as a digital template for creation of copies of the existing 3D solid object.

The 3D model 117 may conform to any 3D printable format as known in the art. For instance, in some embodiments the 3D model 117 may capture unit normal and vertices that define the 3D solid object in the stereolithograpy format. In alternate embodiments, the 3D model 117 may capture a 3D mesh of interconnected triangles that define the 3D solid object in the collaborative design activity (COLLADA) format. In alternate embodiments, the 3D model 117 is created manually and the 3D model generator 110 is not included in the 3D printing system 101.

As shown, the 3D model generator 110 is coupled to the 3D model interactive tool 120. This coupling may be implemented in any technically feasible fashion, such as exporting the 3D model 117 from the 3D model generator 110 and then importing the 3D model 117 to the 3D model interactive tool 120. As also shown, the 3D model interactive tool 120 includes, without limitation, a 3D model graphical user interface (GUI) 122 and an overhang analysis engine 124.

The 3D model GUI 122 is configured to receive designer input information from input devices 112, such as a keyboard or a mouse. After the 3D model interactive tool 120 processes the designer input information in conjunction with the 3D model 117, the 3D model GUI 122 delivers pixels to a display device 114 that may be any conventional cathode ray tube, liquid crystal display, light-emitting diode display, or the like. The 3D model interactive tool 120 is configured to continuously repeat this cycle, enabling the designer to dynamically interact with the 3D model 117 based on corresponding images on the display device 110.

As part of the 3D printing process, designers often "eyeball" the 3D model 117 in an effort to estimate where the support geometry generator 130 is likely to insert support material to reduce the probability of the sagging during bottom-to-top 3D object creation. Advantageously, the overhang analysis engine 124 includes functionality that accurately computes the angles of surfaces in the 3D model 117 relative to the horizontal print bed. Further, the overhang analysis engine 124 works together with the 3D model GUI 122 to highlight surfaces in the 3D model 117 that exceed a maximum overhang threshold (not shown in FIG. 1B). Typically the maximum overhang threshold is the maximum angle that the 3D printer 150 is configured to print without requiring support material.

Based on this visual feedback, the designer may elect to redesign the 3D model 117 to reduce angles or integrate designer-defined support material in discrete locations. Further, the designer may elect to replace the 3D printer 150 with a different 3D printer that is associated with a different maximum overhang threshold. Or the designer may adjust any safety margin incorporated into the maximum overhang threshold. Notably, the overhang analysis engine 124 and the 3D model GUI 122 continually update the overhang data and the image sent to the display device 114 to reflect any changes. Because updates are dynamically reflected in the displayed and highlighted 3D model 117, the designer may efficiently evaluate the impact of various modifications to the 3D model 117 and the 3D printer 150 on the quality of the 3D object.

As shown, the 3D model interactive tool 120 is coupled to the support geometry generator 130. The coupling may be implemented in any technically feasible fashion, such as exporting the 3D model 117 from the 3D model interactive tool 120 and then importing the 3D model 117 to the support geometry generator 130. In alternate embodiments, the 3D model interactive tool 120 is omitted from the 3D printing system 101, and the 3D model generator 110 is coupled directly to the support geometry generator 130

The support geometry generator 130 creates the support geometry 140 that reinforces the 3D model 117. Notably, the support geometry 140 enables the 3D printer 150 to efficiently and cost-effectively fabricate the 3D object without incurring defects attributable to the effects of gravity during the printing process. To reduce the amount and extent of the support geometry 140, the support geometry generator 130 incrementally generates the support geometry 140 as a series of support posts. Together, these support posts buttress surfaces in the 3D model 117 that exceed the maximum overhang threshold. Again, typically the maximum overhang threshold is the maximum angle that the 3D printer 150 may print without risking gravity-related defects.

The support geometry generator 130 includes, without limitation, an incremental graph generator 138, an angle analyzer 132, and an end point selector 134. The incremental graph generator 138 generates a support graph (not shown in FIG. 1B) that serves as a blueprint for the support geometry 140. More specifically, the support graph includes nodes and edges, where each node corresponds to a different point in 3D space, and each edge represents the connection of two points via a support post.

In operation, the incremental graph generator 138 sequentially adds edges to the support graph—starting from each point in the 3D model 117 that requires support and growing the support graph downwards in 3D space. As part of this incremental building process, the angle analyzer 132 evaluates the relationships between various surfaces in the 3D model 117, the dynamically growing support graph, and/or the ground (i.e., the 3D printing surface). For each edge, the end point selector 134 evaluates various end points and then chooses an end point for the edge that optimizes the length and orientation of the support post represented by the edge to streamline the overall support geometry 140.

The 3D printer 150 is any device capable of additively printing a 3D object based on the 3D model 117. The 3D printer may be configured to build-up any type of 3D object in any technically feasible fashion. For instance, in some embodiments, the 3D printer 150 extrudes plastic, and the 3D printer 150 may be configured to print plastic replacement parts for tools based on blueprints expressed as 3D models 117. In other embodiments, the 3D printer 150 generates live cells, and the 3D printer 150 may be configured to print organs, such as kidneys. The support geometry 140 ensures that each successive layer of the 3D object receives the support required to prevent gravity-induced defects, hereby ensuring the integrity of the 3D object throughout the 3D printing process.

After the 3D printer 150 generates the top layer of the 3D object, the support geometry 140 is unnecessary and typically detracts from the aesthetic appeal and/or functionality of the 3D object. The 3D support remover 160 performs removal operations that separate the support material from the 3D object, thereby revealing the 3D object specified by the 3D model 117 unencumbered by the constraints of the manufacturing process. In some embodiments, the 3D support remover 160 is a human who manually cuts away or peels off the support material. In other embodiments, the 3D support material is water soluble, and the 3D support remover 160 is a bath of water.

Irrespective of the type of the 3D support remover 160, the areas where support material are removed from the 3D object often exhibit undesired defects, such as rough textures or small marks on the surface of the 3D object. Again, the 3D model interactive tool 120 enables designers to effectively r educe the extent and/or optimize the location of the support geometry 140. Consequently, the overall quality of the 3D object is increased compared to 3D objects generated using conventional 3D printing systems. Further, the support geometry generator 130 minimizes the amount and extent of the support geometry 140 compared to convention techniques that fill entire volumes with support structures. Thus, the overall efficiency of the 3D printer 150 is increased compared to 3D printers operating in conventional 3D printing systems.

It will be appreciated that the system shown herein is illustrative and that variations and modifications are possible. The connection topology, including the number and arrangement of the 3D model generator 110, the 3D model interactive tool 120, the support geometry generator 130, the 3D printer 150, and the 3D support remover 160, may be modified as desired. In certain embodiments, one or more components shown in FIGS. 1A and 1B may not be present. For instance, both the 3D model generator 110 and the 3D model interactive tool 120 could be eliminated, and the support geometry generator 130 could receive a manually created file as input.

Lastly, the 3D model interactive tool 120 and the support geometry generator 130 may be implemented in any combination of software and hardware units. In some embodiments the angle analyzer 132 may be removed and the associated functionality may be incorporated into one or more different units. In other embodiments, the endpoint selector 134 may be removed and/or the associated functionality may be incorporated into one or more different units, including the incremental graph generator 138.

Identifying and Displaying Overhanging Regions

Figure 2A:
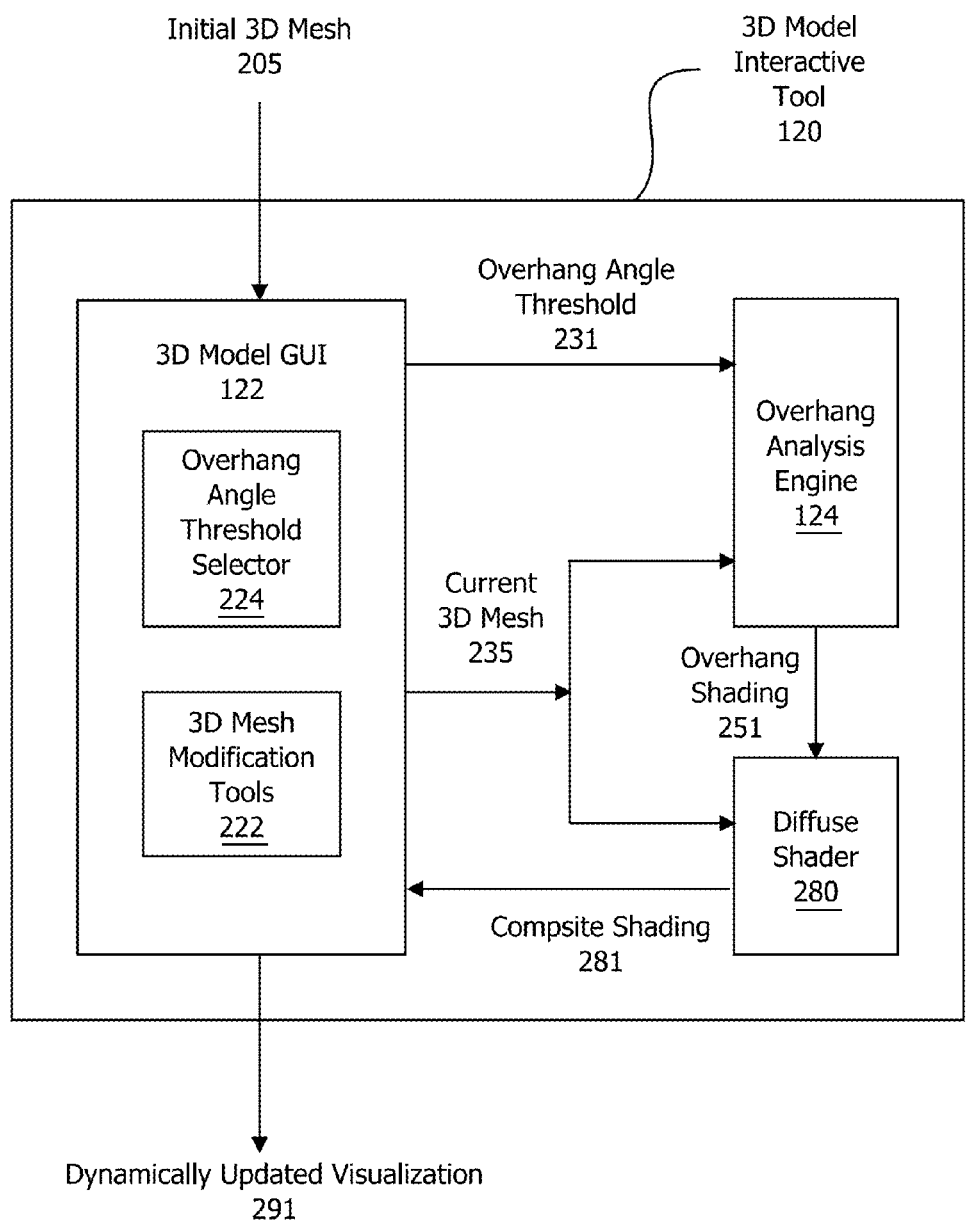
FIG. 2A is a conceptual diagram illustrating how the three-dimensional (3D) model interactive tool of FIG. 1A may be configured to process an initial 3D mesh, according to one embodiment of the present invention.

FIG. 2A is a conceptual diagram illustrating how the three-dimensional (3D) model interactive tool 120 of FIG. 1B may be configured to process an initial 3D mesh 205, according to one embodiment of the present invention. In general, the 3D model interactive tool 120 facilities the visual analysis of the initial 3D mesh 205 and any subsequent modifications to the initial 3D mesh 205, such as a current 3D mesh 235. Notably, the 3D model interactive tool 120 enables efficient and effective graphical portrayal of locations where the 3D printer 140 is configured to insert support material.

As shown, the 3D model interactive tool 120 includes, without limitation, the 3D model GUI 122 of FIG. 1B, the overhang analysis engine 124 of FIG. 1B, and a diffuse shader 280. The 3D model GUI 122 coordinates input and output operations associated with the 3D model interactive tool 120. In general, the 3D model GUI 122 supports imports of different types of 3D models 117, display settings, analysis settings, and the routing of output graphical information to the display device 114.

As also shown, the 3D model GUI 122 includes, without limitation, 3D mesh modification tools 222 and an overhang angle threshold selector 224. In operation, the 3D model GUI 122 receives the initial 3D mesh 205 and establishes the initial 3D mesh 205 as a current 3D mesh 235. Upon receiving changes via the 3D mesh modification tools 222, the 3D model GUI updates the current 3D mesh 235. In alternate embodiments, any technically feasible fashion and/or format for conveying information in a 3D printable form may replace the initial 3D mesh 205 and/or the current 3D mesh 235.

Figure 2B:
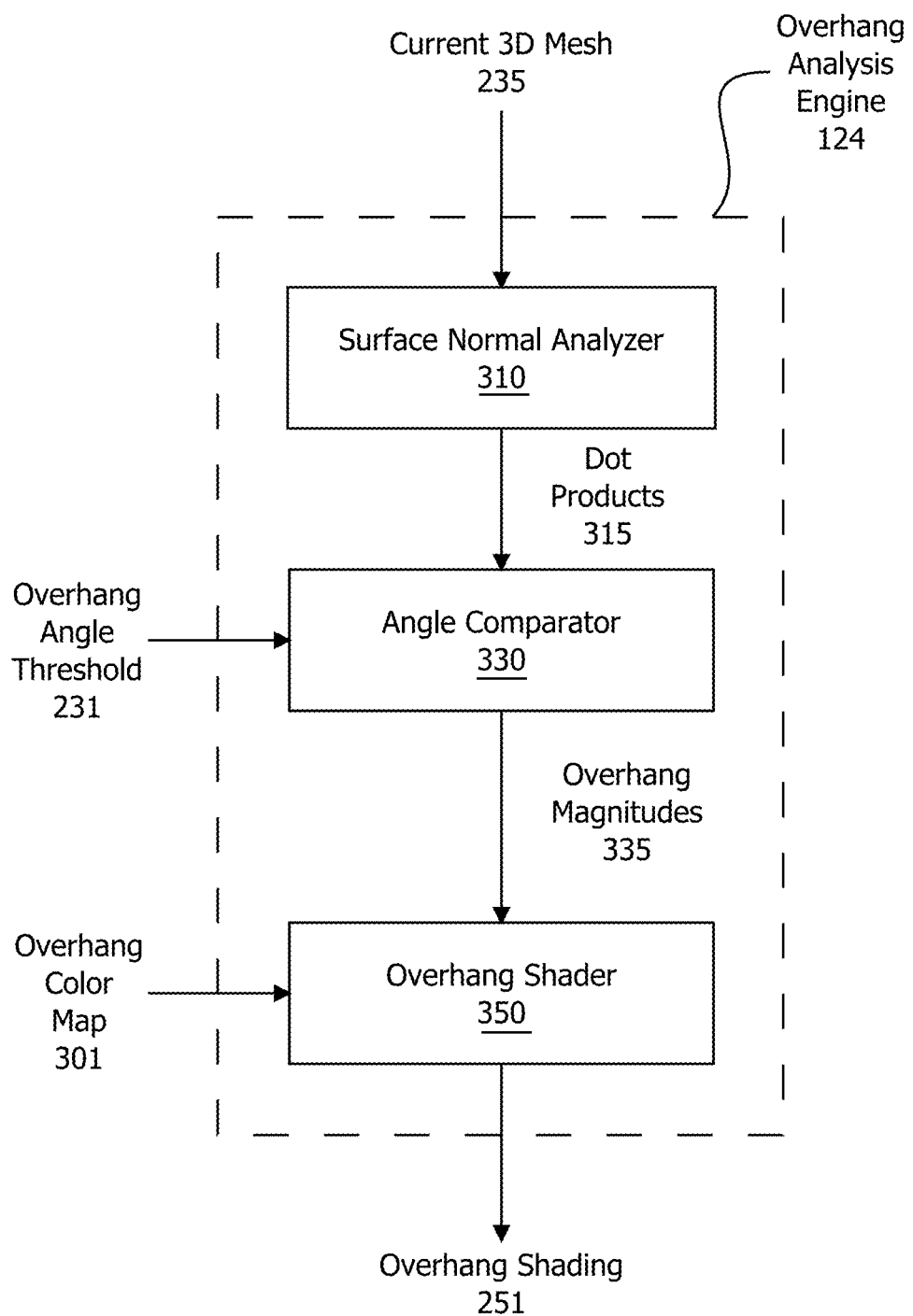
FIG. 2B is a conceptual diagram illustrating how the overhang analysis engine of FIG. 1B may be configured to compute the overhang shading for the current three-dimensional (3D) mesh of FIG. 2A, according to one embodiment of the present invention.

As described in greater detail in conjunction with FIG. 2B, the overhang analysis engine 124 performs overhang computations based on the current 3D mesh 235 and an overhang angle threshold 231 that the designer specifies via the overhang angle threshold selector 224. In some embodiments, the designer sets the overhang angle threshold 231 to match the maximum angle of a local surface patch relative to the horizontal print bed that the 3D printer 140 is configured to print without adding support material. In alternate embodiments, the designer sets the overhang angle threshold 231 to the sum of this 3D printer 140 maximum angle and a "safety" margin. In yet other embodiments, the designer sets the overhang angle threshold 231 based on the characteristics of a different 3D printer to explore the impact of replacing the 3D printer 140 with the different 3D printer.

The overhang angle threshold selector 224 may be implemented in any technically feasible fashion. In some embodiments, the overhang angle threshold selector 224 is implemented as a graphical slider that the designer manipulates to set the overhang angle threshold 231. In other embodiments, the overhang angle threshold selector 224 is a parameter included in a graphical designer-modifiable list of parameters. In yet other embodiments, the overhang angle threshold selector 224 may be implemented as a parameter included in a configuration file or maybe hard-coded as a parameter associated with the 3D printer 140

After receiving and analyzing the current 3D mesh 235 in conjunction with the overhang angle threshold 231, the overhang analysis engine 124 generates an overhang shading 251 based on this analysis. This overhang shading 251 visually emphasizes areas in the current 3D mesh 235 where the angle exceeds the overhang angle threshold 231. Further, the overhang shading 251 depicts the relative degree to which angles exceed the overhang angle threshold 231. For instance, suppose that the overhang analysis engine 124 were configured to generate overhanging shading 251 with blends of white (corresponding to angles less than the overhang angle threshold 231) and red. Further, suppose that one angle were to exceed the overhang angle threshold 231 by 30 degrees, and another angle were to exceed the overhang angle threshold 231 by 10 degrees. In such a scenario, the overhang analysis engine 125 would generate overhang shading 251 in which the location associated with the first angle was represented by a predominantly red shade, and the location associated with the second angle was represented by a predominantly white shade.

Subsequently, the diffuse shader 280 processes the overhang shading 251 in conjunction with the current 3D mesh 235, generating a composite shading 281. The diffuse shader 280 computes diffuse shading across the current 3D mesh 235 using any technique as known in the art. The diffuse shader 280 then applies this diffuse shading to the overhang shading 251. The resulting composite shading 281 reflects both the color specified by the current 3D mesh 235 and the color of the overhang shading 251. In alternate embodiments, the diffuse shader 280 may compute other shading (e.g., ambient shading, specular shading, etc.) in addition to the diffuse shading. In such embodiments, the diffuse shader 280 performs operations that integrate additional shading components into the composite shading 251.

The 3D model GUI 122 receives the composite shading 251 and includes this information in the dynamically updated visualization 291—creating an annotated version of the current 3D mesh 235. The 3D model GUI 122 then transmits the dynamically updated visualization 291 to the display device 114 of FIG. 1A. As disclosed previously herein, initially the current 3D mesh 235 corresponds to the initial 3D mesh 205. However, the 3D model GUI 122 supports changes to the current 3D mesh 235 via the 3D mesh modification tools 222. Consequently, the current 3D mesh 235 may evolve throughout time.

Further, the overhang angle threshold selector 224 supports changes to the overhang angle threshold 231. For instance, after inspecting the dynamically updated visualization 291, the designer may perform smoothing operations via a brush included in the 3D mesh modifications tools 222 to reduce one or more of the highlighted overhangs. Alternatively, the designer may add a support column using the 3D mesh modifications tools 222, thereby controlling the structure of the support material required for manufacturing. In yet other circumstances, the designer may elect to decrease a safety margin included in the overhang angle threshold 231 In such a scenario, the designer may adjust the overhang angle threshold selector 224 to specify a larger value for the overhang angle threshold 231.

After the 3D model GUI 122 receives modifications to the current 3D mesh 235 and/or the overhang angle threshold selector 224, the overhang analysis engine 124 and the diffuse shader 280 re-compute the overhang shading 251 and the composite shading 281 respectively. Subsequently, the 3D model GUI 122 re-generates the dynamically updated visualization 291, and the display device 114 refreshes the displayed image according. Advantageously, this automated analysis-display loop enables the designer to quickly ascertain the impact of changes to the current 3D mesh 235 and/or the overhang angle threshold 231.

As previously disclosed herein, the 3D model interactive tool 120 may be implemented in any technically feasible fashion in any combination of software and hardware. For example, one or more computations performed by the overhang analysis engine 124 may be performed by a graphics processing unit (GPU) shading unit. Similarly, the diffuse shader 280 may be implemented as a GPU shading unit. In alternate embodiments, the functionality described herein may be distributed in any manner across any number of different units. For instance, in some embodiments, the overhang shading 251 and diffuse shading operations are performed by a single composite shading unit.

FIG. 2B is a conceptual diagram illustrating how the overhang analysis engine 124 of FIG. 1B may be configured to compute the overhang shading 251 for the current three-dimensional (3D) mesh 235 of FIG. 2A, according to one embodiment of the present invention. As shown, the overhang analysis engine 124 includes, without limitation, a surface normal analyzer 310, an angle comparator 330, and an overhang shader 350.

In operation, the surface normal analyzer 310 processes the current 3D mesh 235 and generate dot products 315. In particular, surfaces included in the current 3D mesh 235 are represented as one or more triangles (not shown). For each of these triangles, the surface normal analyzer 310 determines the surface normal of the triangle. The surface normal analyzer 310 then performs a per-triangle dot product operation between the corresponding surface normal and the up-axis vector, generating the dot product 315 for the triangle. As persons skilled in the art will recognize, the dot products 315 represent the angle of the triangles relatively to the horizontal print bed of the 3D printer 140. Consequently, the dot products 315 correlate to the generation of support material by the 3D printer 140.

The angle comparator 330 performs comparison operations between the dot products 315 and the overhang angle threshold 231 of FIG. 2A. For each of the dot products 315, if the dot product 315 exceeds the overhang angle threshold 231, then the angle comparator 330 considers the triangle associated with the dot product 315 to be overhanging. Further, the magnitude of the dot product 315 corresponds to the significance of the overhang. After performing the comparison operations, the angle comparator 330 scales the dot products 315 to overhang magnitudes 325 that range in value between zero and one. If the angle comparator 330 does not consider a particular triangle to be overhanging, then the angle comparator 330 sets the value of the corresponding overhang magnitude 335 to zero. By contrast, the angle comparator 330 translates the largest magnitude dot products 315 to overhang magnitudes 335 of one. In alternate embodiments, the angle comparator 330 may be configured to perform any type of operation that yields deterministic information regarding the relative significance of overhangs in the current 3D mesh 235.

Upon receiving the overhang magnitudes 335, the overhang shader 350 applies an overhang color map 310 to the overhang magnitudes 335, thereby generating the overhang shading 251. The overhang shading 251 facilitates the concise transmission of overhang data to the designer via the dynamically updated visualization 291. More specifically, for each triangle, the overhang shading 251 includes a color that is based on the overhang magnitude 335 associated with the triangle. The overhang color map 301 may be conveyed in any technically feasible fashion and may encode the overhang magnitude 335 in any designer-friendly manner. For instance, the color map 310 may map overhang magnitudes 335 of zero to white, overhang magnitudes 335 of one to red, and other overhang magnitudes 335 to a blend of red and white.

Note that the techniques described herein are illustrative rather than restrictive, and may be altered without departing from the broader spirit and scope of the invention. In particular, alternate embodiments include any techniques that automatically generate any type of overhang angle information for 3D printing analysis and/or graphically display such overhang angle information. Notably, alternate embodiments may or may not include modification functionality and configurability.

In alternate embodiments, the current 3D mesh 235 may be replaced with any type of 3D model 117 and may or may not represent the 3D object as triangles. Further, the surface normal analyzer 310, the angle comparator 330, and the overhang shader 350 may be configured to operate on any type of 3D model 117 at any level of granularity (e.g., per-point instead of per-triangle). The functionality included in the overhang analysis engine 124 may be implemented in any combination of software and hardware and divided into any number of discrete units. For instance, in alternate embodiments the functionality of the surface normal analyzer 310, the angle comparator 330, and the overhang shader 350 may be implemented in a single shader that executes on a graphics processing unit (not shown).

Figure 3A:
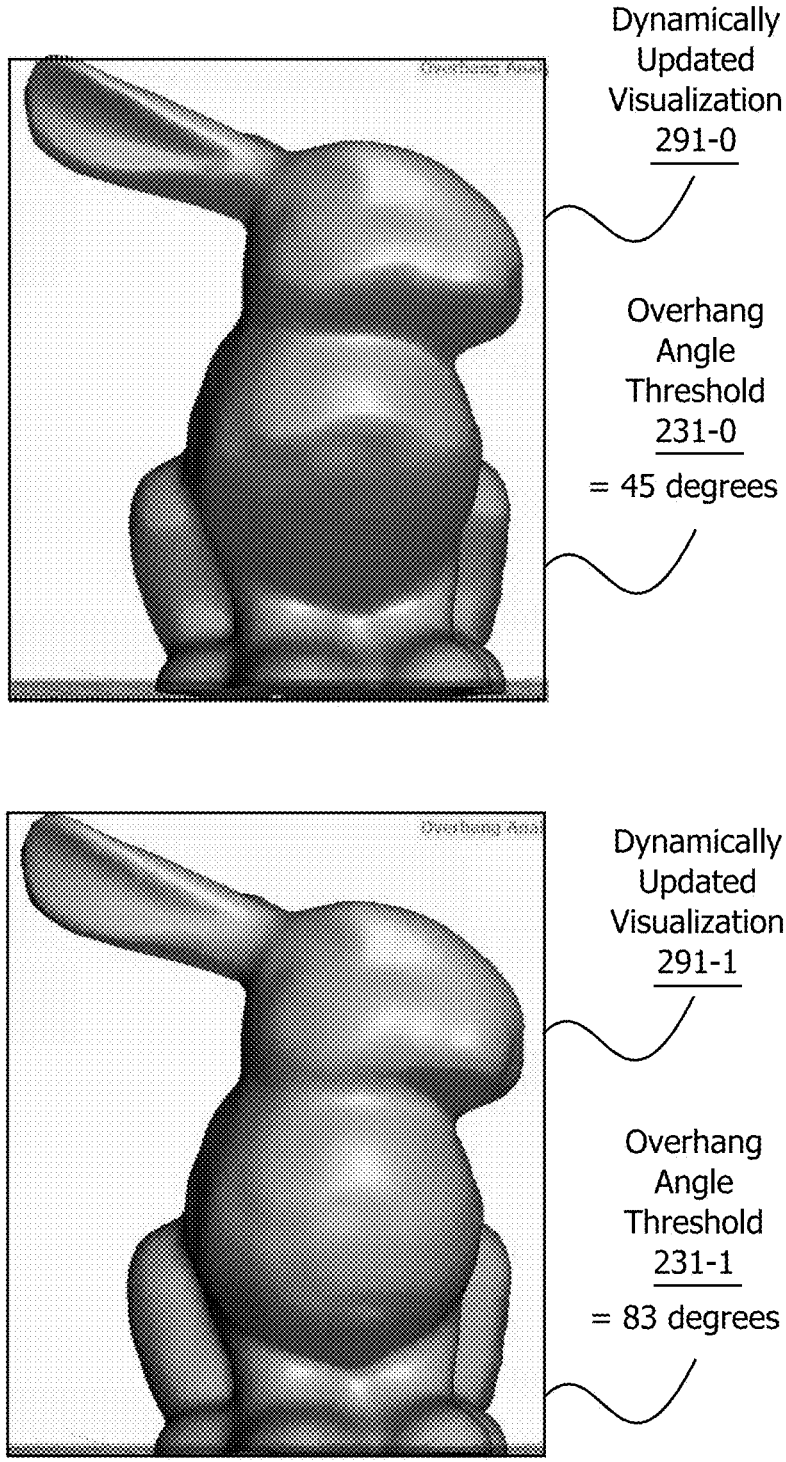
FIG. 3A illustrates the overhang angle thresholds and the dynamically updated visualizations, according to one embodiment of the present invention.

FIG. 3A illustrates the overhang angle thresholds 231-0 and 231-1 and the dynamically updated visualizations 291-0 and 291-1, according to one embodiment of the present invention. Both the dynamically updated visualizations 291-0 and 291-1 depict the same current 3D mesh 235—representing a solid bunny. However, the dynamically updated visualization 291-0 reflects the overhand shading 251-0 associated with the overhang angle threshold 231-0 equal to 45 degrees. And the dynamically updated visualization 291-1 reflects the overhang shading 251-1 associated with the overhang angle threshold 231-1 equal to 83 degrees.

The overhang shading 251-0 and 251-1 communicate the significance of overhangs via the relative "redness" of highlights included in the dynamically updated visualizations 291-0 and 291-1 respectively. Because the overhang angle threshold 231-0 is lower than the overhang angle threshold 231-1, the areas of the dynamically updated visualization 291-0 that exhibit redness are more extensive than the areas of the dynamically updated visualization 291-1 that exhibit redness. FIG. 3A illustrates how the 3D model interactive tool 120 enables designers to quickly and effectively explore the impact of the different overhang angle thresholds 231 on the quality of the 3D model 117. For example, designers may vary the overhang angle threshold 231 to correspond to different potential 3D printers and then compare the overhang shadings 251 depicted in the corresponding dynamically updated visualizations 291 to judiciously select the 3D printer 140 that is included in the 3D printing system 101.

Figure 3B:
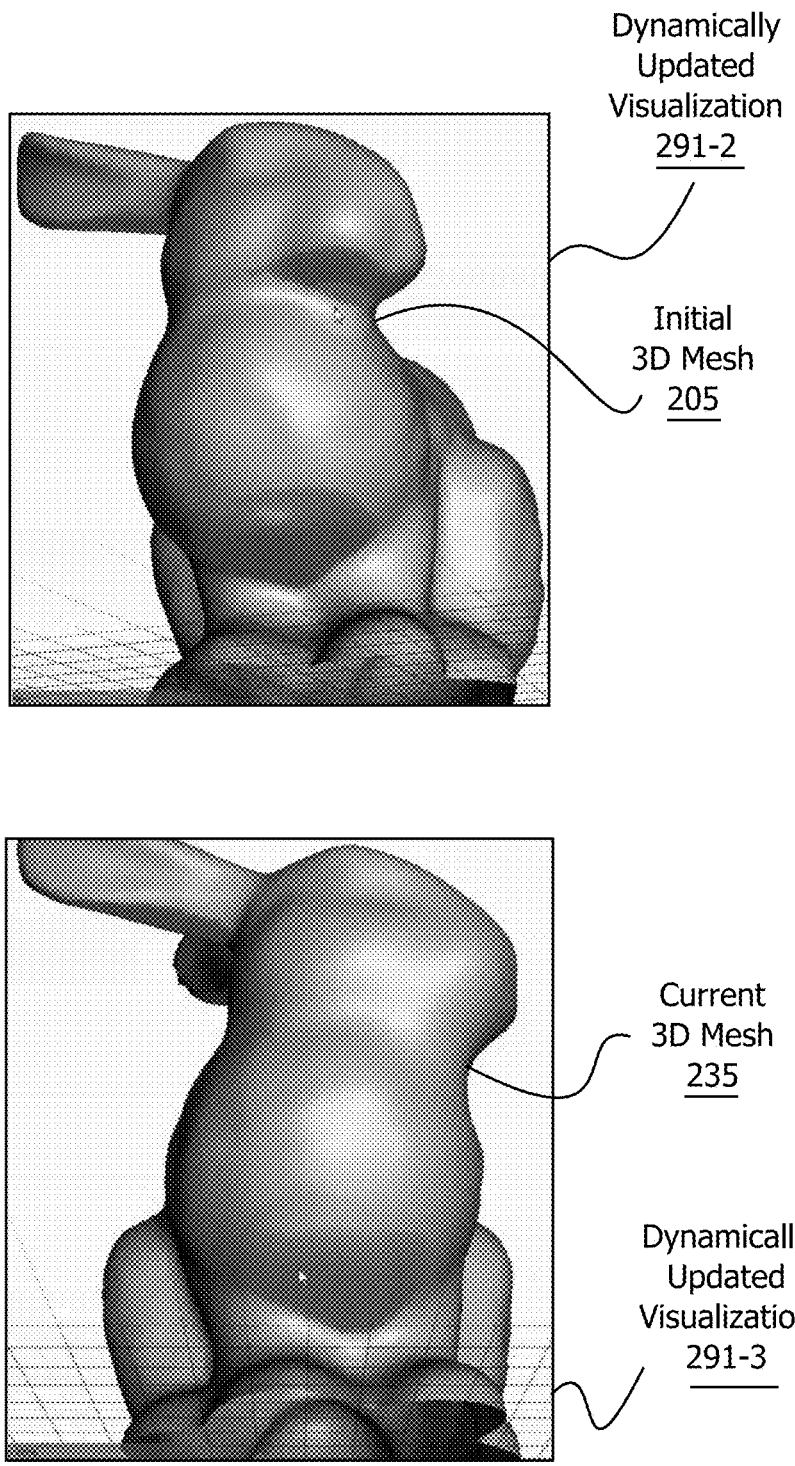
FIG. 3B illustrates the initial three-dimensional (3D) mesh, the current 3D mesh, and the dynamically updated visualizations, according to one embodiment of the present invention.

FIG. 3B illustrates the initial three-dimensional (3D) mesh 205, the current 3D mesh 235, and the dynamically updated visualizations 291-2 and 291-3, according to one embodiment of the present invention. The overhang angle threshold 231 (not shown in FIG. 3B) that corresponds to dynamically updated visualization 291-2 is equal to the overhang angle threshold 231 that corresponds to the dynamically updated visualization 291-3.

For explanatory purposes only, the context of FIG. 3B is that the designer generates the initial 3D mesh 205 via the 3D model generator 110. The 3D model interactive tool 120 receives the initial 3D mesh 205, the overhang analysis engine 124 generates the overhang shading 251-2, and the 3D model GUI 122 relays the dynamically updated visualization 291-2 to the display device 114. As shown, the display device 114 then exhibits a bunny annotated based on the significance of overhangs. The overhangs are highlighted as shades of red based on the overhanging shading 251-2.

The designer then contemplates the surfaces highlighted as overhangs in the dynamically updated visualization 291-2. Based on this visual inspection, the designer determines that, if the 3D printer 140 were to generate the bunny based on the initial 3D mesh 205, then the 3D printer 140 would generate an unacceptable amount and/or location of support material.

To increase the quality of the final 3D object, the designer strategically modifies the initial 3D mesh 205, creating the current 3D mesh 235. In particular, the designer applies a brush included in the 3D mesh modification tools 222 to add material underneath the chin of the bunny, thereby reducing the angles of the surfaces in the chin to below the overhang angle threshold 231. The overhang analysis engine 124 then generates the overhang shading 251-3 corresponding to the current 3D mesh 235. Subsequently, the 3D model GUI 122 annotates the current 3D mesh 235 with the overhang shading 251-3, generating the dynamically updated visualization 291-3. And the display device 114 exhibits the dynamically updated visualization 291-3 instead of the previous dynamically updated visualization 291-2.

As shown, the dynamically updated visualization 291-3 depicts the bunny, but the expanded chin surfaces are no longer highlighted as overhanging. The designer is satisfied with the impact of the modifications, and the 3D printer 140 generates a bloated 3D object based on the current 3D mesh 235. Notably, this bloated 3D object includes the desired 3D object (the bunny) along with support structures. Advantageously, there are no support structures in the chin region of the bunny. Finally, the 3D support remover 150 separates the support material from the non-support material, revealing the desired 3D object (i.e., the bunny) without defects in the chin region.

As the example in FIG. 3B illustrates, the 3D model interactive tool 120 enables designers to quickly and effectively explore the impact of the modifications to the initial 3D mesh 205. In alternate embodiments, suppose that the designer were to determine, based the dynamically updated visualization 291-2 corresponding to the current 3D mesh 325, that the modifications would not cause the desired reduction in overhangs. In such a scenario, the designer could repeat this modification-analysis cycle until the designer determined that the current 3D mesh 235 would cause the desired reductions in overhangs. In this fashion, the designer can interactively optimize the current 3D mesh 235 to ensure that aesthetic and/or functional requirements for the 3D object are attained.

Figure 4:
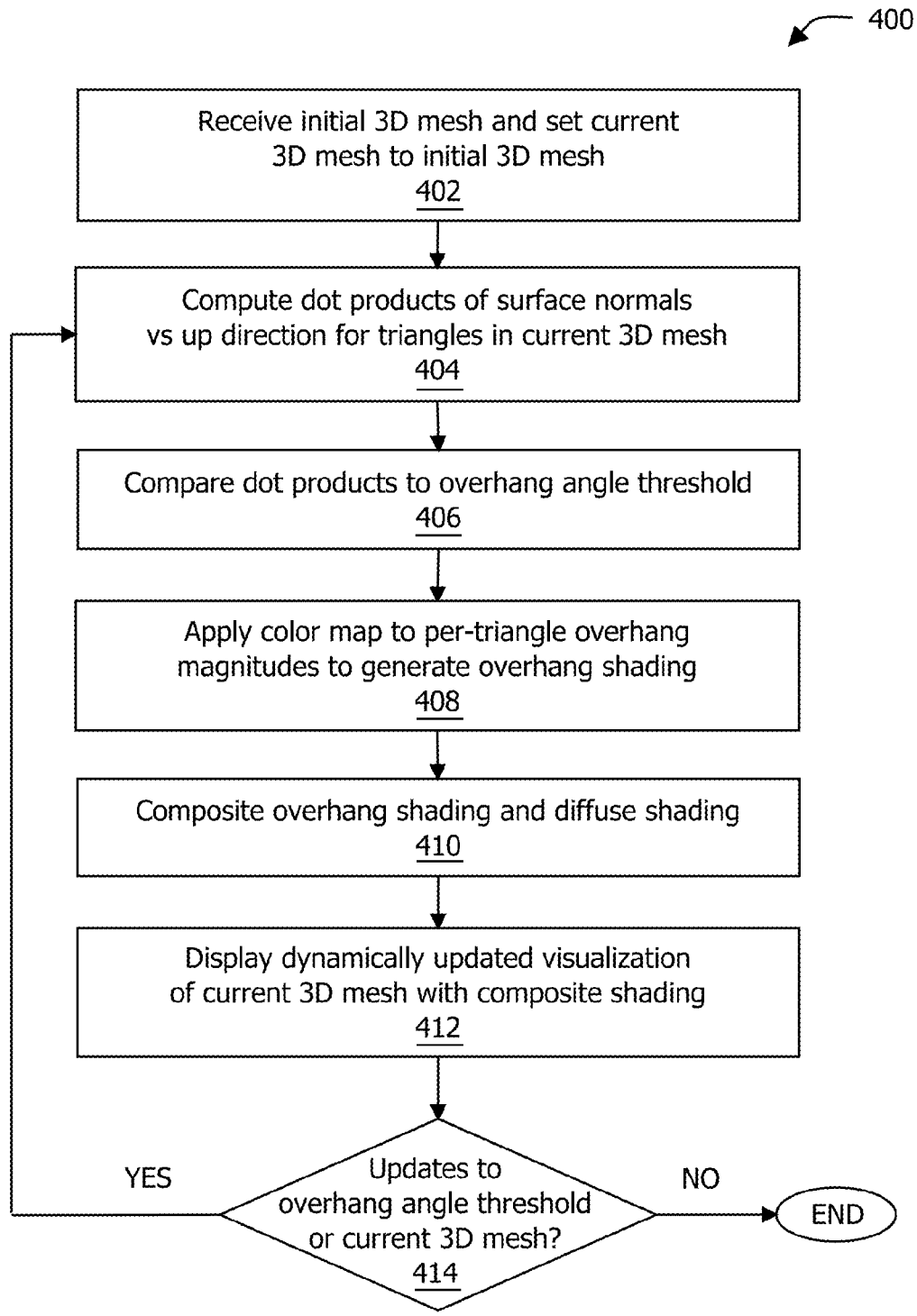
FIG. 4 is a flow diagram of method steps for computing and interactively displaying overhang data for a three-dimensional (3D) mesh, according to one embodiment of the present invention.

FIG. 4 is a flow diagram of method steps for computing and interactively displaying overhang data for a three-dimensional (3D) mesh, according to one embodiment of the present invention. Although the method steps are described with reference to the systems of FIGS. 1-5, persons skilled in the art will understand that any system configured to implement the method steps, in any order, falls within the scope of the present invention.

As shown, a method 400 begins at step 402, where the 3D model GUI 122 receives the initial 3D mesh 205 and sets the current 3D mesh 235 to the initial 3D mesh 205. As part of step 402, the 3D model GUI 122 determines the overhang angle threshold 231 based on the overhang angle threshold selector 224. The overhang angle threshold selector 224 may be implemented in any technically feasible fashion—such as a graphical slider that enables the designer to easily adjust the overhang angle threshold 231. The 3D model GUI 122 transmits the current 3D mesh 2325 and the overhang angle threshold 231 to the overhang analysis engine 214.

At step 404, the surface normal analyzer 310 included in the overhang analysis engine 124 computes the dot products 315 between surface normals corresponding to the current 3D mesh 235 and the up direction. Notably, the surface normal analyzer 310 determines the surface normals per-triangle. In alternate embodiments, the surface normal analyzer may determine the surface normals at any granularity and for any geometric unit that is captured in the current 3D mesh 235.

At step 406, the angle comparator 330, also included in the overhang analysis engine 124, compares each of the dot products 315 to the overhang angle threshold 231. Again, each of the dot products 315 corresponds to a triangle specified in the current 3D mesh 235. If the dot product 315 associated with a particular triangle exceeds the overhang angle threshold 231, then the angle comparator 330 considers the triangle to be overhanging. Further, the magnitude of the dot product 315 corresponds to the significance of the overhang. After performing the comparison operations, the angle comparator 330 converts the dot products 315 to overhang magnitudes 325 that range in value between zero and one. If the angle comparator 330 does not consider a particular triangle to be overhanging, then the angle comparator 330 sets the value of the corresponding overhang magnitude to zero. By contrast, the angle comparator 330 translates the largest magnitude dot products 315 to overhang magnitudes 335 of one. In alternate embodiments, the angle comparator 330 may be configured to perform any type of operation that yields deterministic information regarding the relative significance of overhangs in the current 3D mesh 235.

At step 408, the overhang shader 350 applies the overhang color map 301 to the overhang magnitudes 325, generating the overhang shading 251. The overhang shading 251 provides an easily comprehensible, concise visual representation of the significance of the overhang magnitudes 325 per-triangle across the current 3D mesh 235. In alternate embodiments, the overhang shading 251 may be replaced with any visual means of expressing the overhang magnitudes 325. For instance, in alternate embodiments, the overhang shading 251 may be replaced with numbers and outlines corresponding to the overhanging magnitudes 325.

At step 410, the diffuse shader 280 combines the overhang shading 251 with diffuse shading to form the composite shading 281. In alternate embodiments, the diffuse shader 280 may incorporate any number and types of shading, such as specular shading, into the composite shading 281. Further the diffuse shader 280 may perform shading operations in any technically feasible fashion. In other alternate embodiments, the diffuse shader 280 may perform any number and type of operations that annotate the current 3D mesh 235 with relevant overhang data.

At step 412, the 3D model GUI 122 causes the display device 114 to show the dynamically updated visualization 291 that reflects the composite shading 281. At step 414, if the 3D model GUI 122 does not receive any designer modifications to the overhang angle threshold 231 and/or the current 3D mesh 235, then the 3D printer 140 and the 3D support remover 150 complete the 3D printing process based on the current 3D mesh 235. The method 400 then terminates.

If, at step 414, the 3D model GUI 122 receives designer modifications to the overhang angle threshold 231 and/or the current 3D mesh 235, then the method 400 returns to step 404. The 3D model interactive tool 120 cycles through steps 404 through 414, processing designer modifications until the 3D model GUI 122 does not receive any further designer modifications. In this fashion, the 3D model interactive tool 120 enables the designer to fine-tune the current 3D mesh 235 in an iterative manner. Advantageously, this fine-tuning allows the designer to efficiently evaluate design trade-offs and optimize the 3D object generated by the 3D printing system 101.

Generating Support Posts

Figure 5:
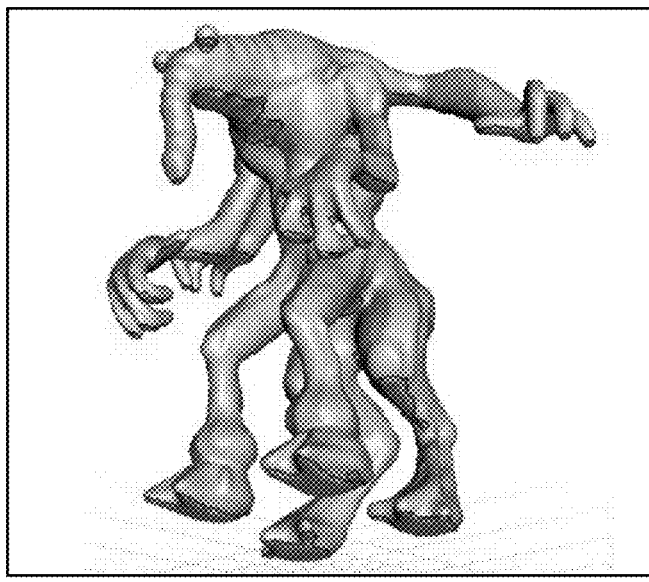
FIG. 5 is a conceptual diagram illustrating a three-dimensional (3D) model with highlighted overhangs and a corresponding 3D model with support geometry, according to one embodiment of the present invention.
Figure 5:
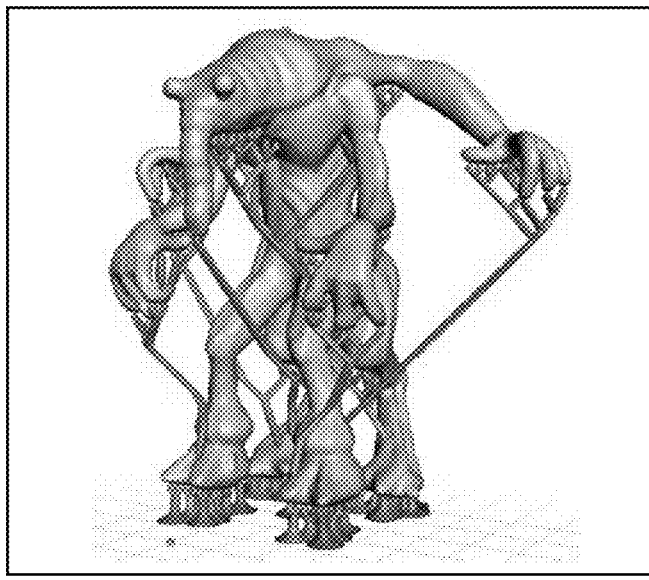

FIG. 5 is a conceptual diagram illustrating a three-dimensional (3D) model with highlighted overhangs 510 and a corresponding 3D model with support geometry 540, according to one embodiment of the present invention. Both the 3D model with highlighted overhangs 510 and the 3D model with support geometry 540 depict the same 3D model 117—representing a solid monster.

For explanatory purposes only, the context of FIG. 5 is that the designer generates the 3D model 117 via the 3D model generator 110. The 3D model interactive tool 120 receives the 3D model 117 and the overhang analysis engine 24 determines the overhanging regions of the 3D model 117 that required buttressing. Notably, as part of the overhang angle analysis, the 3D model interactive tool 120 uses a segmentation algorithm to find explicit boundaries for the overhang regions. The 3D model with highlighted overhangs 510 depicts each discrete overhanging region with blue outlines and red fill. In alternate embodiments, the 3D model interactive tool 120 may determine the overhanging points and/or regions in the 3D model 117 in any technically feasible fashion.

After the 3D model interactive tool 120 identifies the overhanging regions in the 3D object 117, the incremental graph generator 138, the angle analyzer 132, and the end point selector 134 work together to optimize the selection of support posts to brace the 3D model 117. Subsequently, the support geometry generator 130 outputs the support geometry 140. The 3D model with support geometry 540 depicts the combination of the 3D model 117 and the support geometry 140.

Figure 6:
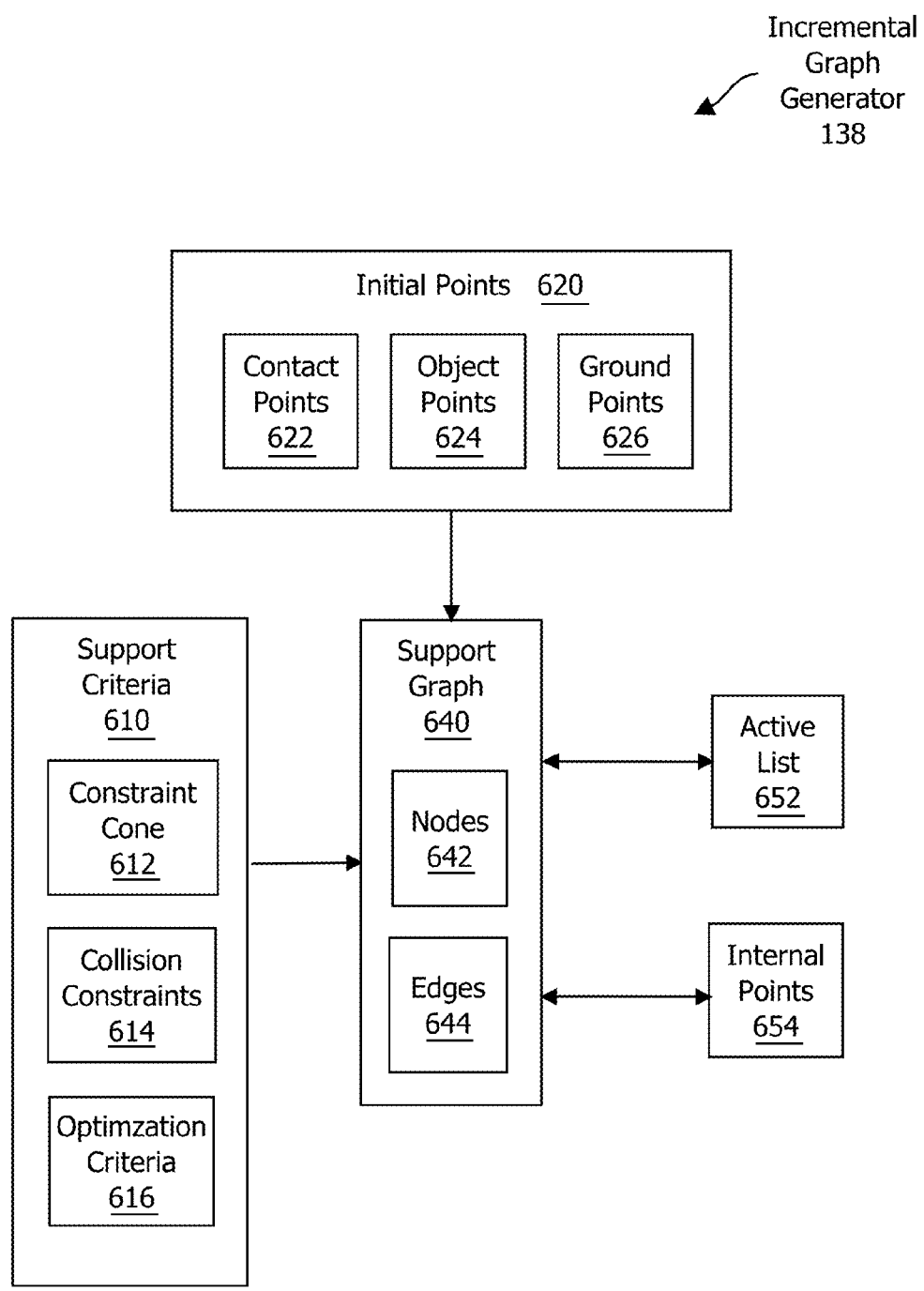
FIG. 6 is a conceptual diagram illustrating the incremental graph generator of FIG. 1B, according to one embodiment of the present invention.

FIG. 6 is a conceptual diagram illustrating the incremental graph generator 138 of FIG. 1B, according to one embodiment of the present invention. The incremental graph generator 138 creates a support graph 640 that subsequently acts as a blueprint for the support geometry 140. Advantageously, the incremental graph generator 138 optimizes the support graph 640 based on the capabilities of the 3D printer 150 to minimize both the material and time required for the 3D printer 150 to generate the support geometry 140.

In operation, the incremental graph generator 138 receives the 3D model 117, generates initial points 620, creates the support graph 640, and then incrementally grows the support graph 640 in the downward direction. Subsequently, the support model generator 130 creates the support geometry 140 based on the support graph 640. The support model generator 130 may generate the support geometry 140 in any technically feasible fashion.

After receiving the 3D model 117, the incremental graph generator 138, in conjunction with the angle analyzer 132, determines the initial points 620. As shown, the initial points 620 include contact points 622, object points 624, and ground points 626. The contact points 622 represent points on the surface of the 3D model 117 that are overhanging and require support during the printing process. The object points 624 are points on the surface of the 3D model 117 that are relatively horizontal and thus are capable of bolstering surfaces of the 3D model 117 that required support. And the ground points 626 are points on the ground (i.e., the horizontal print bed) that may be used to counteract the forces of gravity.

The angle analyzer 132 may generate the initial points 620 in any technically feasible fashion. For example, suppose that an "overhang_angle_threshold" were to reflect the maximum angle the 3D printer 150 were capable of generating without support. Further suppose that a "spacing_distance" were to reflect the maximum vertical distance spanned by the material exuded by the 3D printer 150 in a single step. In such a scenario, the angle analyzer 132 may determine the contact points 622 based on the following pseudo-code:

```
1)    Find the set of triangles T where:
   a) DotProduct(triangle_face_normal,up_direction) >
      Cosine(overhang_angle_threshold)
2)    For the set of triangles T, find all vertices that are local
      minima and add these
      vertices to the contact points.
3)    Apply a reverse-watershed algorithm to cover the
      remaining triangles of the 3D model with well-spaced
      contact points. For each triangle:
   a) Generate a set of sample points p.
   b) For each sample point p, if the distance(p, contact
      points) > spacing_distance, then add p to
      contact_points.
```

As persons skilled in the art will recognize, this pseudo-code typically generates optimized contact points 622 that comprehensively yet non-contiguously cover the overhanging surfaces of the 3D model 117. By contrast, conventional approaches to generating support geometries represent each overhanging surface as a single contiguous area.

In another example, suppose that a "max_object_angle" were to represent a relatively horizontal surface on the 3D model 117 capable of supporting other surfaces of the 3D model 117, such as a surface that is at an angle of less than 60 degrees from the horizontal plane. In such a scenario, the angle analyzer 132 may determine the object points 624 based on the following pseudo-code:

```
1)    Find the set of triangles T where:
   a) DotProduct(triangle_face_normal, up_direction) >
      Cosine (max_object_angle)
2)    Repeat loop:
   a) Generate a random point p on the set of triangles T
   b) If distance(p, existing object points) > spacing_distance,
      then add p to object points
      Stop loop when (2b) has failed more than a predetermined
      number of times, indicating that the relatively
      horizontal surface is well represented.
```

In a final example, support that a "post_radius," a "base_radius," and a "tip_radius" were to represent, respectively, a target radius for support posts, a radius for the base of support posts, and a radius for the tips of support posts (i.e., where they contact the surface of the 3D model 117), In such a scenario, the angle analyzer 132 may generate the ground points 626 based on the following pseudo-code:

```
1)     Compute the 3D bounding box of the surface of the 3D model
2)     Project the 3D bounding box onto the ground plane,
       creating a 2D polygon.
3)     Generate a set of test points P within this 3D polygon,
       where the test points P are organized at the center-points
       of a hexagonal grid.
4)     For each test point p in P:
    a) If the vertical truncated cone centered at p with a predeter-
       mined
       base radius, base length, and tip radius does not interest
       the surface of the 3D object, then add p to the ground points.
```

In alternative embodiments, the angle analyzer 132 may determine the contact points 622, the object points 624, and the ground points 626 in any technically feasible fashion. Further, the predetermined thresholds and dimensions, such as the overhang angle threshold 231, the post_radius, the max_object_angle, etc. may be selected in any fashion that is consistent with the capabilities of the 3D printer 150 and optimizing the support geometry 140. Finally, the angle analyzer 132 may be configured to determine the contact points 622, the object points 624, and the ground 626 points in a dynamic fashion as the incremental graph generator 138 creates the support graph 640 instead of as part of the support graph 640 initialization process.

After determining the initial points 620, the incremental graph generator 138 creates the support graph 640. As shown, the support graph 640 includes nodes 642 and edges 644. In general, the support graph 640 is an abstract specification of a mesh of support posts—the support geometry 140. Each of the edges 644 connects two of the nodes 642, referred to herein as a start node of the edge 644 and an end node of the edge 644. The Y coordinate of the point represented by the start node 642 is greater than or equal to the Y coordinate of the point represented by the end node 642.

The incremental graph generator 138 initializes the support graph 640 to include no edges 644 and one node 642 for each of the initial points 620. Consequently, the initial support graph 640 specifies no support posts. As the incremental graph generator 138 grows the support graph 640—judiciously adding to the edges 644 and the nodes 642—the support geometry 140 specified by the support graph 640 becomes increasingly comprehensive. After the incremental graph generator 130 finishes generating the support graph 640, the support geometry 140 specified by the support graph 640 fully supports the 3D model 117 during the 3D printing process.

In the support geometry 140 specified by the completed support graph 640, each of the object points 624 are adequately bolstered against gravity either directly via one support post or indirectly via a sequential series of support posts. As persons skilled in the art will recognize, one or more of the nodes 642 may not be connected to any of the edges 644. For example, one or more of the ground points 626 may not be necessary as a foundation for the support structure 140. The support geometry generator 130 discards unused nodes 642 in the support graph 640 prior to generating the support structure 140.

To ensure that each of the contact points 622 in the support graph 640 are connected to the support structure 140 prior to the completion of the support graph 640, the incremental graph generator 138 adds the nodes 642 corresponding to the contact points 622 to an active list 652. The active list 652 represents the set of the nodes 642 that are "unterminated." If a node 642 is unterminated, then the node 642 requires support (i.e. does not correspond to any of the ground points 626 or the object points 624) and is not a start node for any of the edges 644. The incremental graph generator 138 sorts the nodes 642 included in the active list 652 in order of decreasing Y coordinate. Consequently, the first node 642 in the active list is the node 642 that is both unterminated and has the highest Y coordinate among the nodes 642 that are unterminated.

In operation, the incremental graph generator 138 dynamically maintains the active list 652 as a sorted queue of the nodes 642 that are not completely processed. The incremental graph generator 138 generates one new edge 644 at a time—selecting the first node 642 from the active list 652 as a new start node 642 and then removing the first node 642 from the active list 652. After the incremental graph generator 138 sets the new start node 642, the end point selector 134 chooses an optimized end point. The incremental graph generator 138 then generates a new edge 644 that connects the new start node 642 to the end node 342 representing the optimized end point. The incremental graph generator 138 continues to generate new edges 644 in this fashion until the incremental graph generator 138 determines that the active list 652 is empty and, therefore, the support graph 640 is complete.

The end point selector 134 determines an end point for each edge 644 based on support criteria 610. As shown, the support criteria 610 include a constraint cone 612, collision constraints 614, and optimization criteria 616. In operation, the end point selector 134 works in conjunction with the angle analyzer 132 to evaluate the relationships between various surfaces in the 3D model 117 and the nodes 642 and edges 644 included in the dynamically growing support graph 640. Based on these relationships and the support criteria 610, the end point selector 134 determines an end point for each support post that optimally leverages the capabilities of the 3D printer 150.

The cone constraint 612 ensures that the angle of the new edge 644 and the ground plane does not exceed the overhang angle threshold 231. The cone constraint 612 may be specified and applied in any technically feasible fashion. For example, in one embodiment, the cone constraint 612 is expressed as the following pseudo-code:

```
1)     Place a code with the tip of the cone at the start
       point p oriented along the Y axis and the
       cone opening angle equal to ( 0.5* PI –
       maximum overhang threshold).
2)     If an end point q is inside the code, then the end
       point q satisfies the cone constraint.
```

The collision constraints 614 ensure that the new edge 644 does not pass within a "post tolerance" of any of the edges 644 in the support graph 640. Further, the collision constraints 614 ensure that the new edge 644 does not intersect the surface of the 3D model 117. In general, the post tolerance is expressed as the sum of the maximum post radius and a post buffer that is specific to the 3D printer 150. The post tolerance and the collision constraints 614 may be determined and implemented in any technically feasible fashion.

The optimization criteria 616 specify desirable qualities for the end points and support posts. In one embodiment, the optimization criteria 136 favors end points that are as close to the surface of the 3D model 117 as possible, thereby minimizing the area spanned by the 3D model 117 combined with the support geometry 140. In such an embodiment, "close" may be defined as either Euclidean distance or Manhattan distance:

1) For two points, a=(x1, y1, z1) and b=(x2, y2, z2):
   a) Euclidean distance from a to b=$\sqrt{((x1-x2)^2+(y1-y2)^2+(z1-z2)^2}$
   b) Manhattan distance from a to b=abs (x1−x2)+abs (y1−y2)+abs (z1−z2)

As persons skilled in the art will recognize, sagacious choices of the optimization criteria 136 reduce both the time required for the 3D printer 150 to generate the 3D object and the cost of the support material associated with the support geometry 140.

As part of processing each start point, the end point selector 134 identifies "potential" end points. First, the end point selector 134 evaluates existing nodes 642 in the support graph 640 to determine those nodes 642 that both lie within the constraint code 612 and satisfy the collision constraints 614. If the end point selector 134 successfully identifies one or more potential end points, then the end point selector 134 applies the optimization criteria 616 to select the potential end point that best meets the optimization criteria 616. After the end point selector 134 identifies this "optimized" end point, the incremental graph generator 138 generates a new edge 644 that connects the node 642 corresponding to the start point to the node 642 corresponding to the optimized end point If the end point selector 134 is unable to identify any potential end points from the nodes 642 included in the support graph 640, then the end point selector 134 generates an internal point 654. The end point selector 134 chooses the internal point 654 in a manner that grows the support graph 640 downward (i.e., towards the ground) and inward (i.e., toward the 3D model 117). Consequently, the end point selector 134 sets the Y coordinate of the internal point 654 to a value that is lower than the Y coordinate of the start point. Further, the end point selector 134 sets both the Y coordinate and the X coordinate of the internal point 654 such that the internal point 654 lies within the constraint cone 612, satisfies the collision constraints 614, and maximizes the optimization criteria 616.

In some embodiments, the end point selector 134 incrementally extends the support graph 640 downward in a fixed Y increment. In one such embodiment, the end point selector 134 sets the Y coordinate of the internal point 654 to a distance two times the support post radius lower than the Y coordinate of the start point. In another embodiment, the end point selector 134 sets the Y coordinate of the internal point 654 to the lowest Y coordinate of the constraint cone 612.

As persons skilled in the art will recognize, the optimization criteria 616 may specify any technically feasible evaluation metric, and the end point selector 134 may implement a variety of strategies to choose the internal point 654. For example, in one embodiment, the optimization criteria 616 configures the end point selector 134 to choose the X coordinate of the internal point 654 to be as close as possible to the X coordinate of the starting point. In another embodiment, the optimization criteria 616 configures the end point selector 134 to choose the internal point 654 to be as close as possible to the surface of the 3D model 117 at the lowest Y-coordinate of the constraint cone:

1) Slice the 3D model at the lowest Y coordinate of the constraint cone
2) Convert the 3D model and the constraint code into a 2D polygon and circle, respectively
3) Set the internal point coordinates to match the point in the circle that is outside yet closest to the 2D polygon In general, the goal of the optimization criteria 616 is to minimize the time required for the 3D printer 150 to fabricate the union of the 3D model 117 and the support geometry 140.

After the end point selector 134 creates the internal point 654, the incremental graph generator 138 creates a new node 644 corresponding to the internal point 654 and creates a new edge 644 that connects the node 642 corresponding to the internal point 654 to the start point. Further, the incremental graph generator 138 adds the internal point 654 to the active list 652, maintaining the active list 652 in order of decreasing Y coordinates.

The optimization techniques described herein are illustrative rather than restrictive, and may be modified to reflect various implementations without departing from the broader spirit and scope of the invention. For instance, suppose that the end point selector 134 were to select one of the other nodes 642 in the active list 652 as the optimized end point. In such a scenario, the end point selector 134 may further fine-tune the support graph 640. More specifically, instead of directly connecting the start point to the optimized end point, the end point selector 134 may indirectly connect the start point to the optimized end point. The end point selector 134 would create a new internal point 654 at a Y-coordinate lower than either the start point or the optimized end point. The incremental graph generator 138 would then create two new edges 644. The first new edge 644 would connect the node 642 corresponding to the start point to the node 642 corresponding to the internal point 654. The second new edge 644 would connect the node 642 corresponding to the internal node 654 to the node 642 corresponding to the optimized end point.

When the incremental graph generator 138 determines that there are no nodes 642 remaining in the active list 652, the support model generator 130 generates the support geometry 140 based on the now-completed support graph 640. More specifically, for each of the edges 644, the support model generator 130 generates the support post as a 3D tube. In some embodiments, the support model generator 130 varies the width of the 3D tube to reduce the extent of the support material. For instance, the support model generator 130 may apply one or more support width heuristics to determine a first support radius and a second support radius. The first support radius corresponds to a minimum width necessary to adequately bolster the 3D object during fabrication. The second support radius corresponds to a minimum width required for adequate contact with the 3D object. The support model generator 130 then varies the width of the 3D tube representing the support post from top to bottom, selecting the first support radius for the middle of the support post and the second support radius for the start point and/or end points.

Notably, the angle of each of the support posts corresponds to the angle of the corresponding edge 644 and, consequently, the support geometry 140 may include support posts at any angle. Typically, the support geometry 140 "hugs" the contours of the 3D model 117—thereby reducing both the time required to fabricate the 3D object and the cost of the support material.

Figure 7:
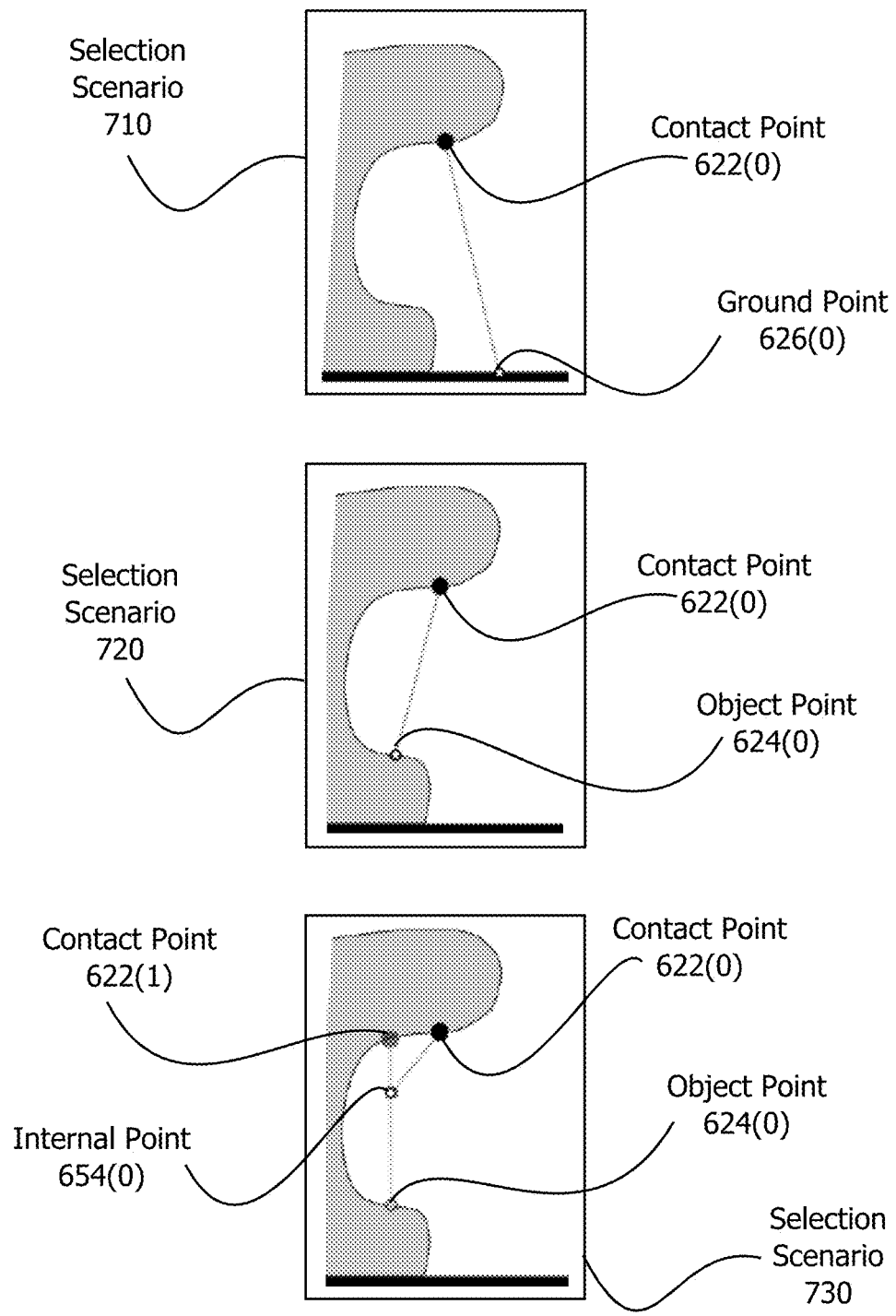
FIG. 7 is a conceptual diagram illustrating selection scenarios that the end point selector of FIG. 1 may be configured to evaluate, according to one embodiment of the present invention.

FIG. 7 is a conceptual diagram illustrating selection scenarios 710, 720, and 730 that the end point selector 134 of FIG. 1 may be configured to evaluate, according to one embodiment of the present invention. As previously disclosed herein, the end point selector 134 identifies points that are located within the constraint cone 612 and satisfy the collision constraints 614. Subsequently, the end point selector 134 picks an optimized end point from these identified points based on the optimization criteria 616. In some embodiments, the end point selector 134 generates a new internal point 654 based on the optimization criteria 616.

In operation, the incremental graph generator 138 selects the first node 642 in the active list 652 as the starting point. The starting point may be one of the contact points 622 or one of the internal points 654. Based on the starting point, the end point selector 134 attempts to identify an optimized end point that, when connected to the starting point via a new edge 644 in the support graph 640, will optimally extend the support graph 640. As part of this selection process, the end point selector 134 works together with the angle selector 132 to identify points that satisfy the support criteria 610, including the constraint cone 612, the collision constraints 614, and the optimization criteria 616.

In one embodiment, the end point selector 134 preferentially selects a point that is represented by one of the existing nodes 642 as the optimized end point. If the end point selector 134 does not successfully identify such a viable "existing" point, then the end point selector 134 generates a new internal point 654 and relays the internal point 654 to the incremental graph generator 138. In alternate embodiments, the end point selector 134 may generate one or more potential internal points 654, evaluate these potential internal points 654 in conjunction with existing points, and select the optimized end point from both the potential internal points 654 and the existing points.

For explanatory purposes only, the context of FIG. 4 is that the incremental graph generator 138 initially selects the contact point 622(0) as the starting point. Based on the support criteria 610, the existing state of the support graph 640, and the geometries included in the 3D model 117, the end point selector 134 evaluates the three different selection scenarios 710, 720, and 730.

First, as shown in selection scenario 710, the end point selector 134 considers the ground point 626(0) as the optimized end point. The selection scenario 710 depicts the contact point 622(0) connected to the ground point 626(0). Subsequently, in selection scenario 720, the end point selector 134 considers the object point 624(0) as the optimized end point. The selection scenario 720 depicts the contact point 622(0) connected to the object point 624(0). Finally, the end point selector 134 elects to generate the internal point 654(0) instead of selecting either the ground point 626(0) or the object point 624(0) as the optimized end point.

After the end point selector 134 generates and selects the internal point 654(0) as the optimized end point for the contact point 622(0), the incremental graph generator 138 adds a new node 642 and a new edge 644 to the support graph 640. This new node 642 corresponds to the internal point 654(0), and the new edge 644 connects the contact point 622(0) to the internal point 654(0). The incremental graph generator 138 then selects a next starting point—the contact point 622(1)—and relays the contact point 622(1) to the end point selector 134 for pairing to an optimized end point.

As depicted in selection scenario 730, the end point selector 134 selects the existing internal point 654(0) as the optimized end point for the contact point 622(1). Subsequently, the incremental graph generator 138 grows the support graph 640—connecting the contact point 622(1) to the internal point 654(0) via a second new edge 644.

Finally, the incremental graph generator 138 selects a third starting point—the internal point 654(0)—and relays the internal point 654(0) to the end point selector 134 for pairing to an optimized end point. The end point selector 134 selects the object point 624(0) as the optimized end point for the internal point 654(0), and the incremental graph generator 138 adds another new edge 644 to the support graph 640. This new edge 644 connects the internal point 654(0) to the object point 624(0). As illustrated in FIG. 4, incrementally building the support graph 640 based on optimizing end points enables adequate buttressing of both the contract points 622(0) and 622(1) while streamlining the support geometry 140 to the contours of the 3D model 117.

Figure 8A:
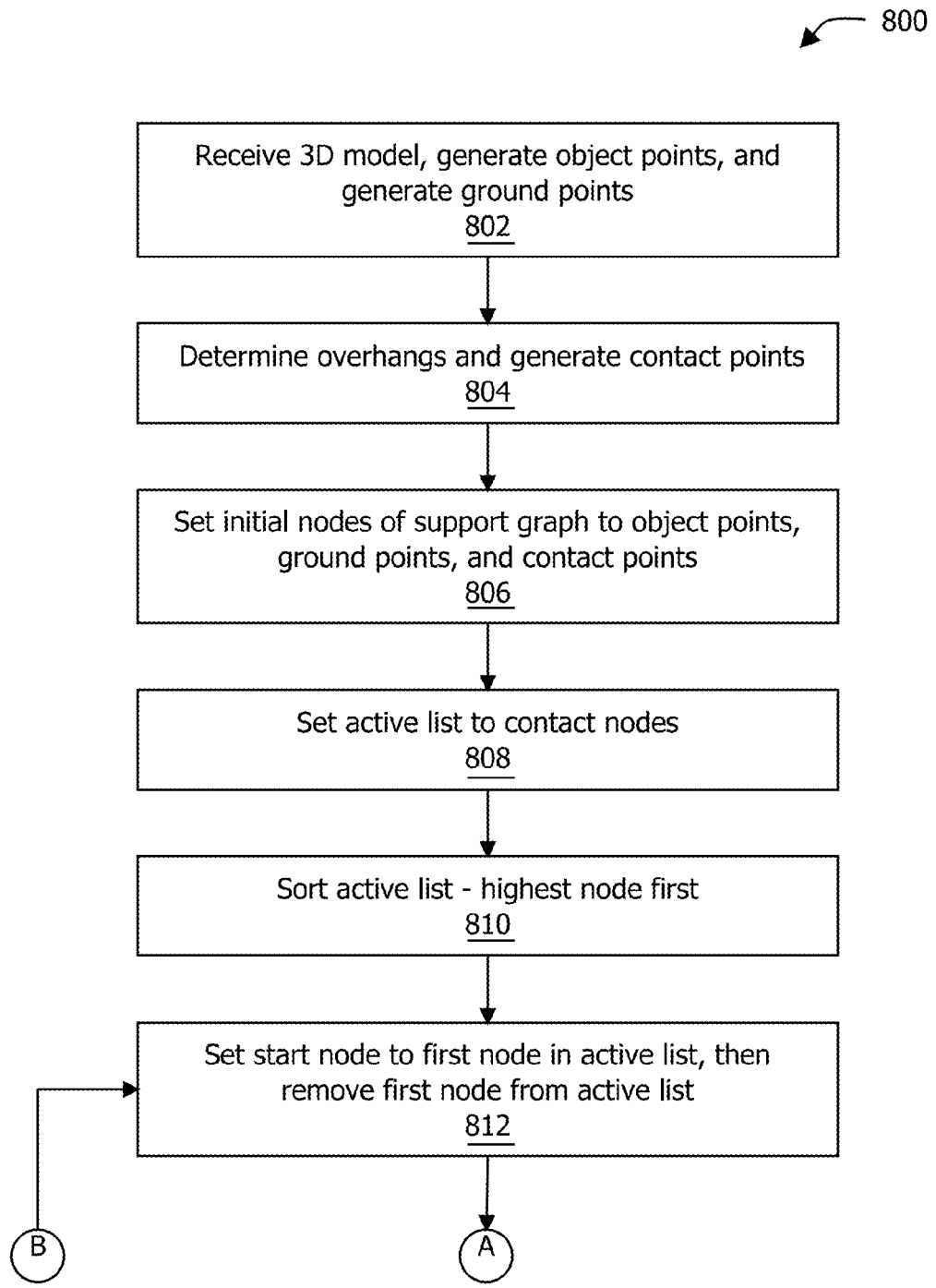
FIGS. 8A-8B set forth a flow diagram of method steps for generating support geometry to facilitate printing of a three-dimensional (3D) model, according to one embodiment of the present invention.
Figure 8B:
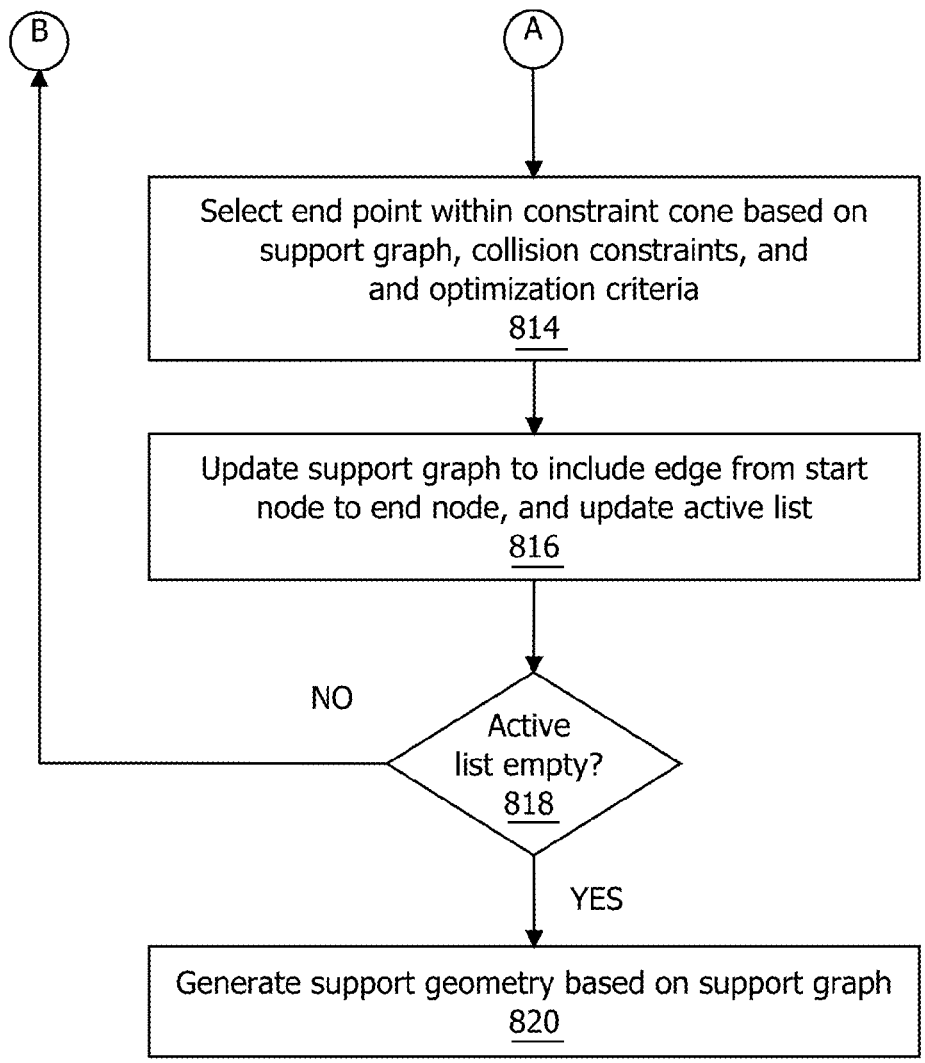

FIGS. 8A-8B set forth a flow diagram of method steps for generating support geometry to facilitate printing of a three-dimensional (3D) model, according to one embodiment of the present invention. Although the method steps are described with reference to the systems of FIGS. 1-4, persons skilled in the art will understand that any system configured to implement the method steps, in any order, falls within the scope of the present invention.

As shown, a method 800 begins at step 802, where the support geometry generator 130 receives the 3D model 117. After receiving the 3D model 117, the angle analyzer 132 included in the support geometry generator 130 identifies the ground points 626 and the object points 624 that are included in the initial points 620. Notably, the identified object points 624 correspond to surfaces of the 3D model 117 that are relatively horizontal and, therefore, capable of supporting portions of the 3D model 117 at higher Y coordinates.

At step 804, the overhang analysis engine 124 identifies overhanging regions of the 3D model 117. The overhang analysis engine 124 may identify these overhanging regions in any technically feasible fashion. As part of step 804, the incremental graph generator 138 included in the support geometry generator 130 generates the contact points 622 that span each overhanging region. Advantageously, the incremental graph generator 138 maximizes the spacing of the contact points 622 to minimize the surface area of each overhanging region that is directly connected to the support geometry 140.

At step 806, the incremental graph generator 138 initializes the support graph 640. In particular, the incremental graph generator 138 generates one node 642 for each of the contact points 622, the object points 624, and the ground points 626. The support graph 640 in this initial state includes no edges 644. At step 808, the incremental graph generator 138 sets the active list 652 to include the contact points 622. Thus, the active list 652 represents the points on the surface of the 3D model 117 that require support to enable the 3D printer 150 to generate a quality 3D object for the 3D model 117.

At step 810, the incremental graph generator 138 sorts the nodes 642 included in the active list 652 by decreasing vertical coordinates. After the incremental graph generator 138 completes this sort, the first node 642 in the active list 652 is at the highest height of the nodes 642 in the active list 652. Correspondingly, the last node 642 in the active list 652 is at the lowest height of the nodes 642 in the active list 652. As the incremental graph generator 138 incrementally grows the support graph 640, the incremental graph generator 138 maintains the active list 652 as a sorted queue representing the nodes 642 in the support graph 640 that are unterminated.

At step 812, the incremental graph generator 138 sets a start node 642 to the first node 642 in the active list 652 and removes the first node 642 from the active list 652. At step 814, the end point selector 134 included in the support geometry generator 130 evaluates the point corresponding to the start node 642 in conjunction with the support criteria 610, the existing support graph 640, and the 3D model 117 to determine an optimized end point. Notably, the end point selector 134 chooses an optimized end point that is located with the constraint cone 612, complies with the collision constraints 614, and reflects the optimization criteria 616. Notably, the end point selector 134 may elect to generate a new internal point 654 as the optimized end point.

At step 816, the incremental graph generator 138 updates the support graph 640 and the active list 652 to reflect a new edge 644 that connects the start node 642 to the node 642 corresponding to the optimized end point. As part of step 816, if the optimized end point is not included in the support graph 640 (i.e., the optimized end point is a new internal point 654), then the incremental graph generator 138 adds a new node 642 that represents the optimized end point to the support graph 640. Further, if the optimized end point is included in neither the ground points 626 nor the object points 624, then the support geometry generator 130 adds the node 642 representing the optimized end point to the active list 652. Thus, the incremental graph generator 138 queues the optimized end point for later reprocessing as a start point.

At step 818, if the incremental graph generator 138 determines that the active list 652 is empty, then the method 800 proceeds to step 820. At step 820, the support geometry generator 130 creates the support geometry 140 corresponding to the completed support graph 640. Notably, the support geometry generator 130 creates a support post for each of the edges 644 included in the support graph 640. The support geometry generator 130 may generate the support geometry 140 in any technically feasible fashion that is consistent with the fabrication constraints (e.g. minimum structure width, etc.) of the 3D printer 150.

If, at step 818, the incremental graph generator 138 determines that the active list 652 is not empty, then the method 800 returns to step 812, where the incremental graph generator 138 processes the first node 642 in the active list 652 as the start node 642. The support geometry generator 130 cycles through steps 812-818, processing nodes 642 in the active list 652 until the active list 652 is empty and the support graph 640 is complete.

Figure 9:
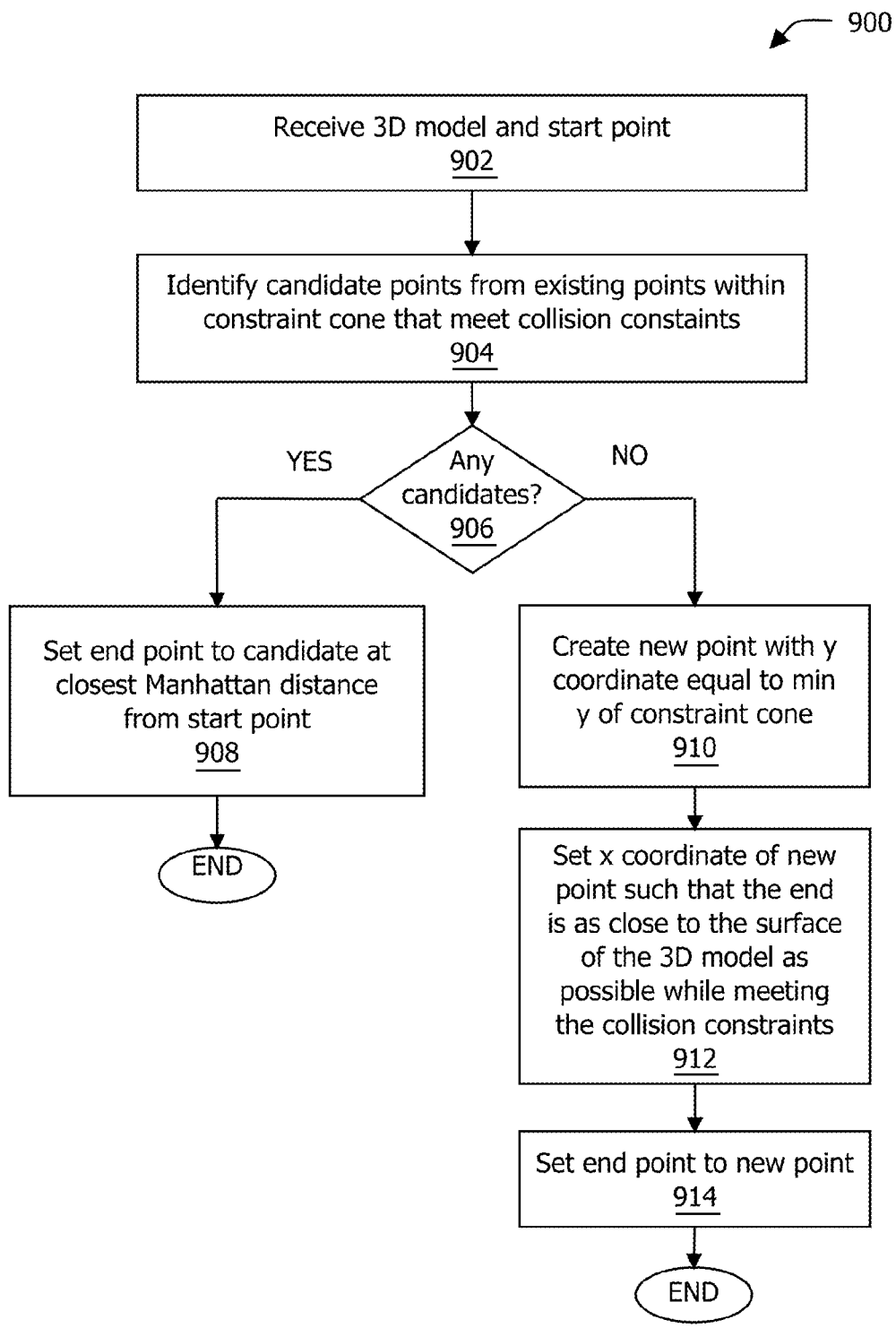
FIG. 9 is a flow diagram of method steps for selecting an optimized end point for a support structure that facilitates printing of a three-dimensional (3D) model, according to one embodiment of the present invention.

FIG. 9 is a flow diagram of method steps for selecting an optimized end point for a support structure that facilitates printing of a three-dimensional (3D) model, according to one embodiment of the present invention. Although the method steps are described with reference to the systems of FIGS. 1-4, persons skilled in the art will understand that any system configured to implement the method steps, in any order, falls within the scope of the present invention.

As shown, a method 900 begins at step 902, where the end point selector 134 receives the 3D model 117 and a start point. The start point may be any contact point 622 on the surface of the 3D model 117 that is overhanging and requires support to prevent gravity-related artifacts during 3D printing. Alternatively, the start point may be an internal point 654 in the incrementally-generated support graph 640 that is not yet connected to a suitable support point, such as one of the ground points 626 or the relatively-horizontal object points 624.

At step 904, the end point selector 134 attempts to identify one or more acceptable candidate points from the points represented by the nodes 642 included in the support graph 640. Each acceptable candidate point lies within the constraint cone 612 and satisfies the collision constraints 614. As outlined previously herein, the constraint cone 612 specifies a region that satisfies any desirable restrictions on the location of the support geometry 140. For instance, the constraint cone 612 may be a 3D cone with the tip at the start point, oriented along the vertical axis, with both a cone opening angle and a height based on the capabilities of the 3D printer 150. And, for each candidate point, the collision constraints 612 ensure that if the candidate point were to be connected to the start point via a support post, then the support post would not intersect the 3D model 117.

At step 906, if the end point selector 134 determines that there are one or more candidate points, then the method 900 proceeds to step 908. At step 908, the end point selector 134 calculates the Manhattan distance of each candidate point to the start point. The end point selector 134 then selects the candidate point at the closest Manhattan distance to the start point as the end point. In alternate embodiments, the end point selector 134 may evaluate the candidate points and then select the end point in any technically feasible fashion. For example, the end point selector 134 may calculate the Euclidian distance of each candidate point to the start point and subsequently select the candidate point at the closest Euclidian distance to the start point as the end point.

If, at step 908, the end point selector 134 determines that there are no candidate points, then the method 900 proceeds to step 910. At step 910, the end point selector 134 creates the internal point 654 and initializes the Y coordinate of the internal point 654 to the lowest Y coordinate within the constraint cone 612. Setting the Y coordinate in this fashion situates the internal point 654 at the furthest allowable vertical distance from the start point and, therefore, the closest allowable vertical distance to the ground. At step 912, the end point selector 134 establishes a region of potential X coordinates for the internal point 654 that both situate the internal point 134 within the constraint cone 612 and satisfy the collision constraints 614. The end point selector 134 then selects the potential X coordinate that situates the new point as close to the surface of the 3D model 117 as possible. At step 914, the end point selector 134 sets the end point to the internal point 654.

In sum, the disclosed techniques may be used to automate portions of the 3D object design process. In operation, an overhang analysis engine calculates the dot products of the surface normal vs the up direction for different triangles included in a 3D mesh that represents a 3D object. The overhang analysis engine compares these dot products to a configurable overhang angle threshold. This overhang angle threshold is typically selected to reflect the maximum angle that a particular 3D printer is configured to generate 3D solid objects without adding support material and, optionally, a "safety" margin. The differences between the dot products and the overhang angle threshold reflect the degree with which each triangle included in the 3D mesh exceeds the overhang angle threshold. The overhang analysis engine then generates overhang shading that visually represents the relative impact of overhangs on the 3D object extruded by the 3D printer.

A diffuse shader composites the overhang shading with the diffuse shading associated with the 3D mesh to create overall shading. Subsequently, a 3D model graphic user interface visually displays the shaded 3D mesh—enabling the designer to easily identify those portions of the 3D mesh requiring support material. Various 3D mesh modification tools and an overhang angle threshold selector enable the designer to quickly alter the 3D mesh and the overhang angle threshold to reduce the extent or structure of the required support material. For instance, the designer may perform sculpting operations on the 3D mesh to reduce overhang angles or add support columns to the 3D mesh, thus controlling the type of support structures. Alternatively, the designer may adjust the overhang angle threshold to correspond to a larger overhang angle threshold associated with a more advanced 3D printer. Upon adjusting the 3D model 117 or the overhang angle threshold, the overhang analysis engine re-computes the overhang shading, and the 3D mesh GUI redisplays the 3D mesh with the updated composite shading.

Advantageously, automating overhang analysis and visually highlighting potentially problematic regions in the 3D mesh increases both the likelihood of producing high quality 3D objects and the time required to fine-tune 3D meshes. In particular, designers may use automated tools to efficiently direct re-design efforts to reduce the extent of support material generated by 3D printers. And, in general, reducing the extent of the support material reduces aesthetic (e.g., incorrect textures) and/or functional (e.g., drooping) defects associated with removal of the support material to reveal the final 3D object. Further, enabling interactive modifications of both the 3D mesh and the overhang angle threshold facilitates quickly and accurately assessing the impact of different 3D models and 3D printers on the quality of generated 3D objects.

Further, the disclosed techniques may be used to create support structures designed to be efficiently exuded by 3D printers while ensuring the integrity of 3D models throughout the fabrication process. Again, the overhang angle threshold reflects fabrication limitations of a 3D printer. Accordingly, the overhanging surfaces identified by the overhang analysis engine require support as the 3D printer fabricates the 3D object specified by the 3D model. After the overhang analysis engine has identified the overhanging surfaces, a support geometry generator creates a support graph that is a blueprint for an optimized support structure for the 3D model.

The support geometry generator creates the support graph in an incremental process—starting at the topmost overhanging surface and proceeding towards the ground. The support graph includes edges between contact nodes representing the overhanging surfaces and additional nodes representing points on stabilizing surfaces capable of buttressing the overhanging surfaces. These stabilizing surfaces include the 3D printing surface (i.e. the ground) and relatively horizontal 3D model surfaces. As part of expanding the support graph downwards, the support geometry generator may generate internal, lower, nodes and then connect the existing support graph nodes to these internal nodes. After generating the support graph, the support geometry generator translates each of the edges into a support post with a width that minimally, yet effectively, supports the connected overhanging structures. Together, these support posts form an optimized support structure.

In some embodiments, the support geometry generator includes optimization criteria to minimize the volume spanned by the 3D model combined with the support structure. Again, the support geometry generator may insert internal nodes as part of growing the graph downwards. In such scenarios, the support geometry generator detects and exploits flexibility in the selection of the internal nodes to grow the support graph inward as opposed to outwards. In particular, the support geometry generator selects internal nodes that connect to the existing graph by edges that are as close to the surface of the 3D model as possible—without violating any constraints. The constraints, such as limiting the angle between each edge and the ground plane, ensure that the generated support structure is both cohesive and separable from the 3D model.

Advantageously, the timed required for a 3D printer to generate support material for a set of interconnected support posts that spans a particular volume is typically much less than the timed required for the 3D printer to generate support material that homogenously fills the volume. Consequently, the disclosed techniques for generating sparse support structures enable 3D printers to more efficiently fabricate robust 3D models than conventional techniques that rely on relatively densely packed support structures. Further, since sparse support structures include less support material than dense support structures, the cost of fabricating 3D models with interconnected support posts is reduced compared to fabricating 3D models with conventional support structures. Judiciously selecting the angles of support posts to reduce gaps between the support posts and the boundaries of the 3D object further reduces both the time required to generate the 3D object and the cost of the associated support material.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A method for generating a plurality of support posts that is implemented on a computer when printing three-dimensional models, the method comprising:
   identifying, via a processor, a first overhanging surface in a three-dimensional model based on a maximum overhang threshold, wherein the first overhanging surface includes a first contact point and a second contact point;
   generating a first set of support posts that connects the first contact point to a first support point;
   generating, based on a post tolerance value, a second set of support posts that connects the second contact point to a second support point, wherein no post included in the second set of support posts intersects the first set of support posts; and
   causing the three-dimensional model, the first set of support posts, and the second set of support posts to be printed by a three-dimensional printer.

2. The method of claim 1, wherein the first support point is associated with at least one of a horizontal ground plane and a surface of the three-dimensional model.

3. The method of claim 1, wherein at least one of the support posts included in the first set of support posts resides at an angle that is less than ninety degrees relative to a horizontal ground plane.

4. The method of claim 1, wherein generating the first set of support posts comprises generating a first support post by:

selecting an internal node that resides at a specified vertical distance from the first contact point, wherein the angle between the internal node and the first contact point does not exceed a maximum constraint angle; and generating a three-dimensional support structure that spans from the first contact point to the internal point.

5. The method of claim 1, wherein generating the first set of support posts comprises generating a first support post:

creating a first support graph that connects a first node to a second node via a first edge, wherein the first node represents the first contact point and the second node represents the first support point; and creating a three-dimensional tubular object that delineates the first edge.

6. The method of claim 5, wherein the three-dimensional tubular object varies in diameter between a first support radius and a second support radius, and further comprising applying one or more support width heuristics to the first edge to determine the first support radius and the second support radius.

7. The method of claim 1, wherein generating the first set of support posts comprises generating a first support post and a second support post by:

creating a first support graph that connects a first node to a second node via a first edge, wherein the first node represents the first contact point and the second node that represents an intermediate point that resides between the first node and the first support point in the vertical direction;

incrementally modifying the first support graph to include a third node that is connected to the second node via a second edge, wherein the third node represents the first support point;

creating a first three-dimensional tubular object that delineates the first edge; and creating a second three-dimensional tubular object that delineates the second edge.

8. The method of claim 1, wherein generating the first set of support posts occurs at least partially in parallel with generating the second set of support posts.

9. The method of claim 1, wherein a first support post included in the first set of support posts is also included in the second set of support posts.

10. A non-transitory computer-readable storage medium including instructions that, when executed by a processing unit, cause the processing unit to generate a plurality of support posts that are implemented when printing three-dimensional models, by performing the steps of:

identifying a first overhanging surface in a three-dimensional model based on a maximum overhang threshold, wherein the first overhanging surface includes a first contact point and a second contact point;

generating a first set of support posts that connects the first contact point to a first support point;

generating, based on a post tolerance value, a second set of support posts that connects the second contact point to a second support point, wherein no post included in the second set of support posts intersects the first set of support posts; and causing the three-dimensional model, the first set of support posts, and the second set of support posts to be printed by a three-dimensional printer.

11. The non-transitory computer-readable storage medium of claim 10, wherein the first support point is associated with at least one of a horizontal ground plane and a surface of the three-dimensional model.

12. The non-transitory computer-readable storage medium of claim 10, wherein at least one of the support posts included in the first set of support posts resides at an angle that is less than ninety degrees relative to a horizontal ground plane.

13. The non-transitory computer-readable storage medium of claim 10, wherein generating the first set of support posts comprises generating a first support post by:

selecting an internal node that resides at a specified vertical distance from the first contact point, wherein the angle between the internal node and the first contact point does not exceed a maximum constraint angle; and generating a three-dimensional support structure that spans from the first contact point to the internal point.

14. The non-transitory computer-readable storage medium of claim 10, wherein generating the first set of support posts comprises generating a first support post:

creating a first support graph that connects a first node to a second node via a first edge, wherein the first node represents the first contact point and the second node represents the first support point; and creating a three-dimensional tubular object that delineates the first edge.

15. The non-transitory computer-readable storage medium of claim 14, wherein the three-dimensional tubular object varies in diameter between a first support radius and a second support radius, and further comprising applying one or more support width heuristics to the first edge to determine the first support radius and the second support radius.

16. The non-transitory computer-readable storage medium of claim 10, wherein generating the first set of support posts comprises generating a first support post and a second support post:

creating a first support graph that connects a first node to a second node via a first edge, wherein the first node represents the first contact point and the second node that represents an intermediate point that resides between the first node and the first support point in the vertical direction;

incrementally modifying the first support graph to include a third node that is connected to the second node via a second edge, wherein the third node represents the first support point;

creating a first three-dimensional tubular object that delineates the first edge; and creating a second three-dimensional tubular object that delineates the second edge.

17. The non-transitory computer-readable storage medium of claim 10, wherein generating the first set of support posts occurs at least partially in parallel with generating the second set of support posts.

18. The non-transitory computer-readable storage medium of claim 10, wherein a first support post included in the first set of support posts is also included in the second set of support posts.

19. A system configured to print three-dimensional models and a plurality of support posts, the system comprising:

a memory storing instructions; and a processing unit that is coupled to the memory and, when executing the instructions, is configured to:

identify a first overhanging surface in a three-dimensional model based on a maximum overhang threshold, wherein the first overhanging surface includes a first contact point and a second contact point, generate a first set of support posts that connects the first contact point to a first support point, generate, based on a post tolerance value, a second set of support posts that connects the second contact point to a second support point, wherein no post included in the second set of support posts intersects the first set of support posts, and cause the three-dimensional model, the first set of support posts, and the second set of support posts to be printed by a three-dimensional printer.

20. The system of claim 19, wherein the first support point is associated with at least one of a horizontal ground plane and a surface of the three-dimensional model.

* * * * *